United States Patent
Kato et al.

(10) Patent No.: US 11,155,020 B2
(45) Date of Patent: *Oct. 26, 2021

(54) DEVICE FOR ATTACHING MOUTHPIECE TO INNERLINER OF AIRCRAFT WATER TANK

(71) Applicant: The Yokohama Rubber Co., LTD., Tokyo (JP)

(72) Inventors: Hayato Kato, Hiratsuka (JP); Takahiro Ozawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 195 days.

This patent is subject to a terminal disclaimer.

(21) Appl. No.: 16/469,610

(22) PCT Filed: Dec. 11, 2017

(86) PCT No.: PCT/JP2017/044407
§ 371 (c)(1),
(2) Date: Jun. 13, 2019

(87) PCT Pub. No.: WO2018/110509
PCT Pub. Date: Jun. 21, 2018

(65) Prior Publication Data
US 2020/0086547 A1     Mar. 19, 2020

(30) Foreign Application Priority Data
Dec. 13, 2016 (JP) .................. 2016-241201

(51) Int. Cl.
*B29C 51/12* (2006.01)
*B29C 51/30* (2006.01)
(Continued)

(52) U.S. Cl.
CPC ............ *B29C 51/12* (2013.01); *B29C 51/306* (2013.01); *B29C 51/38* (2013.01); *B29C 51/428* (2013.01);
(Continued)

(58) Field of Classification Search
CPC ............ B65D 1/48; B65D 39/082–088; B29C 49/0005; B29C 53/602; B29C 65/48;
(Continued)

(56) References Cited

U.S. PATENT DOCUMENTS 5,556,497 A * 9/1996 Murphy ................. B29C 66/80
156/172
6,230,922 B1 5/2001 Rasche et al.
(Continued)

FOREIGN PATENT DOCUMENTS

JP    H11-147262    6/1999
JP    2001-524653   12/2001
(Continued)

OTHER PUBLICATIONS

International Search Report for International Application No. PCT/JP2017/044407 dated Mar. 6, 2018, 4 pages, Japan.

*Primary Examiner* — Matthew J Daniels
*Assistant Examiner* — Andrew L Swanson
(74) *Attorney, Agent, or Firm* — Thorpe North & Western

(57) ABSTRACT

A device for attaching a mouthpiece to an innerliner of an aircraft water tank is provided. A cylinder portion of an innerliner is thermally deformed to conform to an inner circumferential portion of a cylinder-like portion, and an inner circumferential portion of a dome portion of the innerliner is attached to a skirt portion by an adhesive. A lower mold includes two sections inserted inside the innerliner from the inner side of a mouthpiece in a folded state. The two sections are opened inside the innerliner and a (Continued)

holding member holds the two sections in an open state. The lower mold can be disposed in the innerliner sealed from the inner side of the mouthpiece, and abutment of an outer abutting surface of an upper mold against a first annular surface and abutment of an inner abutting surface of the lower mold against a second annular surface can be performed.

9 Claims, 22 Drawing Sheets

(51) Int. Cl.
*B29C 51/38* (2006.01)
*B29C 51/42* (2006.01)
*B65D 88/14* (2006.01)
B29C 65/54 (2006.01)
B29L 31/00 (2006.01)

(52) U.S. Cl.
CPC .............. B65D 88/14 (2013.01); *B29C 65/54* (2013.01); *B29L 2031/7154* (2013.01)

(58) Field of Classification Search
CPC ......... B29C 65/70; B29C 70/06; B29C 70/16; B29C 53/56–78; B29C 70/026; B29C 22/003; B64D 11/00; B64D 11/02; B29K 2023/06; B29K 2023/12; B29L 2031/3076; B29L 2031/712; Y02T 50/40; B65C 1/48; B65C 1/42
See application file for complete search history.

(56) References Cited

U.S. PATENT DOCUMENTS

| 6,793,095 | B1* | 9/2004 | Dulisse | ............... B29C 66/5344 220/612 |
|---|---|---|---|---|
| 2018/0142839 | A1 | 5/2018 | Taguchi et al. | |
| 2019/0170300 | A1* | 6/2019 | Cola | ....................... F17C 13/00 |

FOREIGN PATENT DOCUMENTS

| JP | 2009-115126 | | 5/2009 |
|---|---|---|---|
| JP | 2009285691 | A * | 12/2009 |
| JP | 2011-251736 | | 12/2011 |
| WO | WO 99/27293 | | 6/1999 |
| WO | WO 2016/194574 | | 12/2016 |

* cited by examiner

FIG. 12A
FIG. 12C
FIG. 12B
FIG. 12D
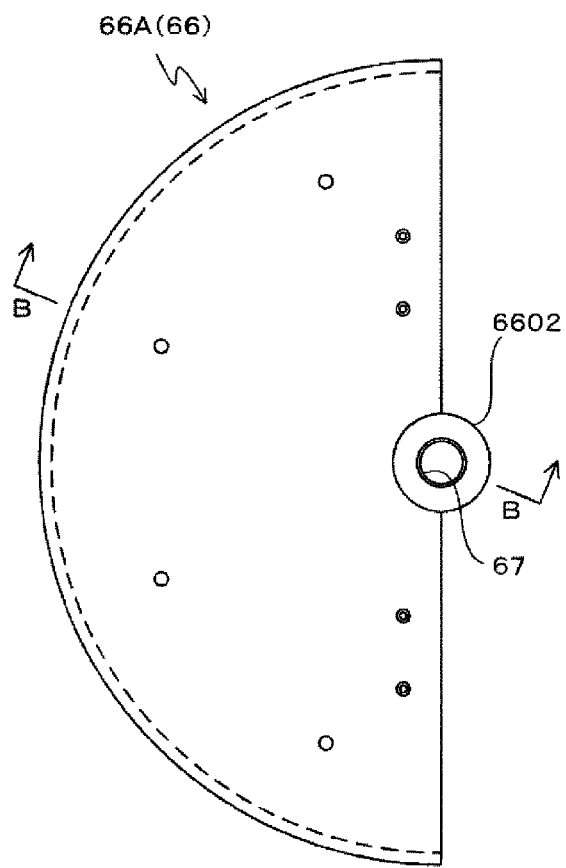
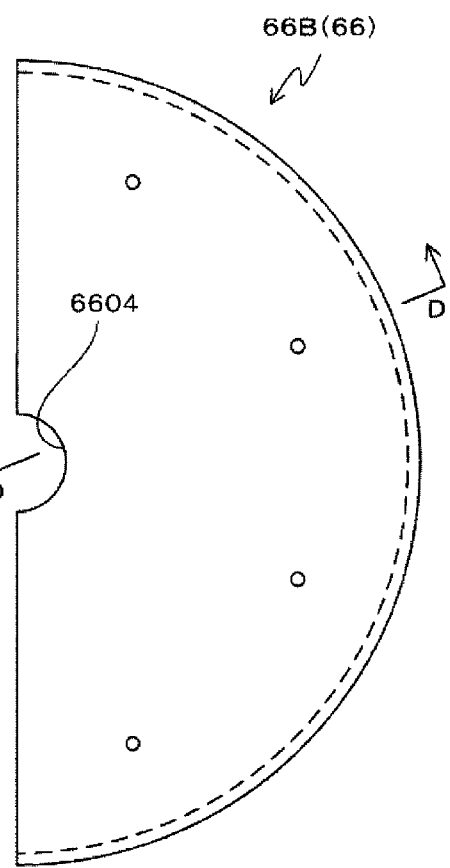
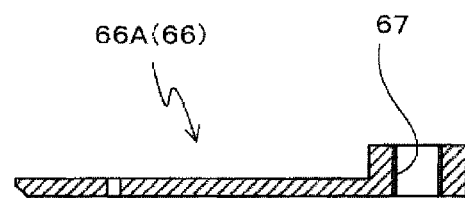
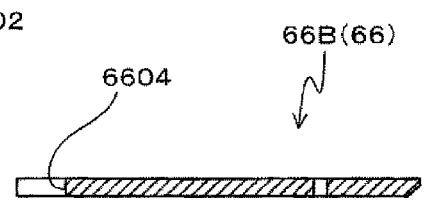

FIG. 21A  FIG. 21C
FIG. 21B  FIG. 21D
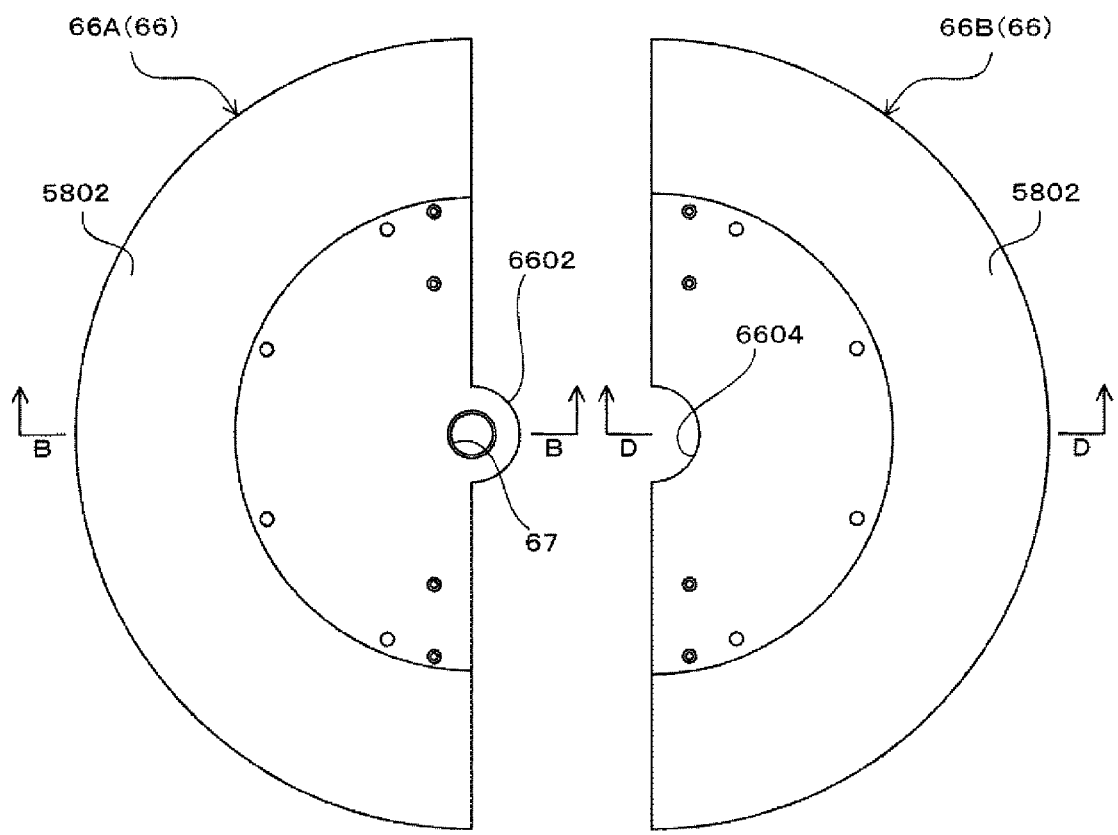
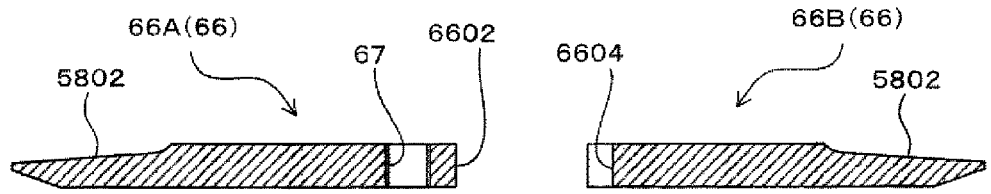

FIG. 22A
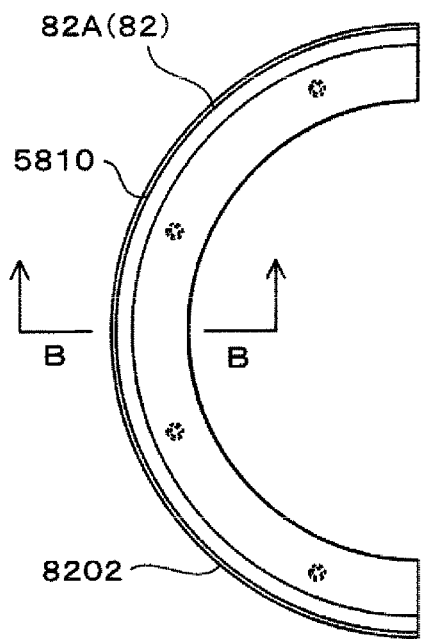
FIG. 22B
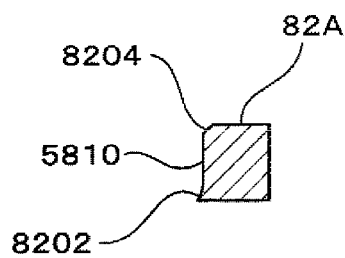
FIG. 22C
FIG. 22D
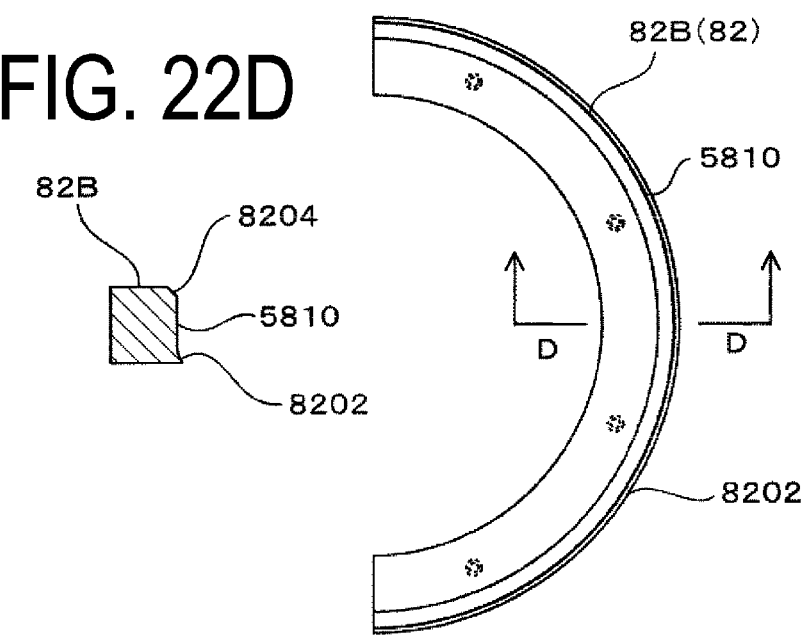

DEVICE FOR ATTACHING MOUTHPIECE TO INNERLINER OF AIRCRAFT WATER TANK

TECHNICAL FIELD

The present technology relates to a device for attaching a mouthpiece to an innerliner of an aircraft water tank.

BACKGROUND ART

Known aircraft water tanks include a tank body including an innerliner and a fiber-reinforced resin layer that covers the innerliner. The tank body includes a cylindrical portion and a dome portion on either side of the cylindrical portion.

In an aircraft water tank, an opening portion is centrally provided on the dome portions on both sides for cleaning the inside of the tank body. The opening portion includes a mouthpiece centrally attached to the dome portion and a lid removably joined to the mouthpiece via an O-ring.

The mouthpiece includes a cylinder-like portion with a female thread to which a male thread of the lid engages and a skirt portion that extends outward in the radial direction of the cylinder-like portion from the end portion of the cylinder-like portion. The innerliner is attached to the inner circumferential surface of the skirt portion by an adhesive, and the fiber-reinforced resin layer is attached to the outer circumferential surface of the skirt portion (see Japan Unexamined Patent Publication No. 2011-251736).

The end portion of the innerliner is located closer to the inside of the tank body than the O-ring on the inner circumferential surface of the skirt portion, and when the aircraft water tank is in use, drinking water directly comes into contact with the inner circumferential surface of the skirt portion including the end portion of the innerliner.

Thus, in a known aircraft water tank, to stop water from directly coming into contact with the mouthpiece and the adhesive that attaches the innerliner to the skirt portion when in use, the surface of the skirt portion around the end portion of the innerliner requires a coating process of applying a Food and Drug Administration (FDA) approved material.

This adds a coating step to the manufacturing process of the aircraft water tank, and at the time of maintenance, the coating must be inspected and repaired. Accordingly, there is a demand for enhancement to increase manufacturing efficiency, to reduce costs, and to increase the efficiency of maintenance operations.

The present applicant has proposed an aircraft water tank in which the end portion of the innerliner is disposed farther to the outside of the tank body than the O-ring so that drinking water does not come into contact with the end portion of the innerliner when the aircraft water tank is in use (see International Patent Publication No. WO 2016/194574).

In this technology, a cylinder-like portion to which a lid is joined is provided on a mouthpiece, a skirt portion that extends radially outward is provided on an end portion of the cylinder-like portion in an axial direction, a first annular surface facing the direction opposite that of the skirt portion is formed on the cylinder-like portion, and a second annular surface facing the direction opposite that of the first annular surface is formed on the skirt portion.

The innerliner is formed by blow molding to form a cylindrical portion, a dome portion, and a cylindrical cylinder portion that continues radially inward of the dome portion.

The cylinder portion of the innerliner is inserted inside the cylinder-like portion of the mouthpiece, the cylinder portion of the innerliner is abutted against the first annular surface of the mouthpiece and attached thereto via thermal deformation using a mold, and an inner circumferential portion of the dome portion of the innerliner is abutted against the second annular surface and attached thereto by an adhesive.

An end portion on one side in the axial direction of the cylinder portion of the innerliner corresponds to a sealed space on the inner side of the cylindrical portion and the dome portion. Thus, the operation of abutting the cylinder portion of the innerliner against the first annular surface of the mouthpiece and performing thermal deforming can be performed in the sealed space, leading to no problems.

However, the operation of abutting the inner circumferential portion of the dome portion of the innerliner against the second annular surface of the mouthpiece and attaching them by an adhesive is an operation performed in the sealed space on the inner side of the dome portion. Thus, a mold for abutting the inner circumferential portion of the dome portion against the second annular surface of the mouthpiece cannot be inserted in the sealed space on the inner side of the dome portion, leading to manufacturing problems.

SUMMARY

The present technology provides a device for attaching a mouthpiece to an innerliner of an aircraft water tank, wherein a cylinder portion of an innerliner can be abutted against and attached to a first annular surface of a mouthpiece, and an inner circumferential portion of a dome portion of the innerliner can be abutted against and attached to a second annular surface of the mouthpiece.

An embodiment of the present technology is a device for attaching a mouthpiece to an innerliner of an aircraft water tank, wherein a cylinder portion centrally located on a dome portion of an innerliner is located on an inner side of an annular mouthpiece, the cylinder portion abuts against a first annular surface that extends in an annular manner with an axial center of the mouthpiece as a center, and a section of the dome portion near the cylinder portion abuts against a second annular surface that extends in an annular manner with the axial center of the mouthpiece as a center and that faces an opposite direction to the first annular surface, the device comprising:

an upper mold;
a lower mold; and
a biasing portion that biases the upper mold and the lower mold toward one another; wherein
the lower mold comprises
two sections coupled together and swingable between an open state in which the two sections are opened flat and a folded state in which the two sections are folded and comprising an inner abutting surface capable of abutting a section of the dome portion near the cylinder portion of the innerliner against the second annular surface,
a holding portion capable of holding the two sections in the open state, and
a shaft member joined to one of the two sections that projects along an axial center of the inner abutting surface from a center of the two sections in the open state; and
the upper mold comprises
an outer abutting surface coaxially disposed with the lower mold, from above the lower mold, in a manner allowing the outer abutting surface to move, the outer abutting surface abutting the cylinder portion against the first annular surface, the shaft member being inserted into the outer abutting surface.

The two sections are inserted inside the innerliner from the inner side of the mouthpiece in a folded state. Then, the two sections are opened inside the innerliner, and the holding member holds the two sections in an open state.

In other words, the lower mold can be disposed in the space of the innerliner sealed from the inner side of the mouthpiece, and the abutment of the outer abutting surface of the upper mold against the first annular surface of the cylinder portion and the abutment of the inner abutting surface of the lower mold against the second annular surface of a section of the dome portion near the cylinder portion can be performed.

Accordingly, the cylinder portion of the innerliner can be reliably thermally deformed to conform to the first annular surface of the mouthpiece, and the inner circumferential portion of the dome portion can be reliably attached to the skirt portion by an adhesive.

BRIEF DESCRIPTION OF DRAWINGS

FIG. 12A is a plan view of one of the plate sections that constitutes the lower mold according to the first embodiment. FIG. 12B is a cross-sectional view along line B-B of FIG. 12A. FIG. 12C is a plan view of the other plate section that constitutes the lower mold. FIG. 12D is a cross-sectional view along line D-D of FIG. 12C.

FIG. 13A illustrates a state in which the holding member is located on one of the plate sections and the two plate sections are in a foldable state. FIG. 13B illustrates a state in which the holding member is located spanning across the two plate sections and an open state is being held.

FIG. 21A is a plan view of one of the plate sections that constitutes the lower mold according to the second embodiment. FIG. 21B is a cross-sectional view along line B-B of FIG. 21A. FIG. 21C is a plan view of the other plate section that constitutes the lower mold. FIG. 21D is a cross-sectional view along line D-D of FIG. 21C.

FIG. 22A is a plan view of one of the outer circumferential members according to the second embodiment. FIG. 22B is a cross-sectional view along line B-B of FIG. 22A. FIG. 22C is a plan view of the other outer circumferential member. FIG. 22D is a cross-sectional view along line D-D of FIG. 22C.

DETAILED DESCRIPTION

First Embodiment

Next, embodiments of the present technology will be described with reference to the drawings.

Firstly, an aircraft water tank 10 will be described with reference to FIG. 1.

The aircraft water tank 10 is installed in an aircraft and contains drinking water. The aircraft water tank 10 includes a tank body 12, the inside of which corresponds to a water containment space.

The tank body 12 includes a cylindrical portion 14 and dome portions 16 provided on both sides of the cylindrical portion 14.

Figure 2:
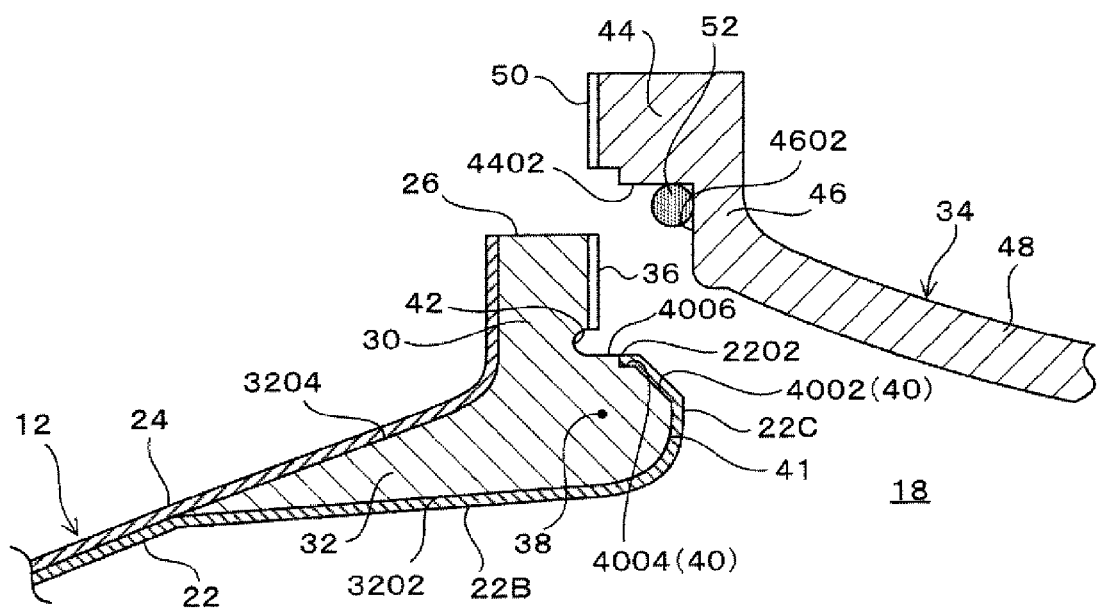
FIG. 2 is an enlarged view of a main portion of a mouthpiece and a lid with the mouthpiece and the lid separated.

As illustrated in FIG. 2, opening portions 18 for cleaning the inside of the tank body 12 are centrally provided on both dome portions 16, and each of the opening portions 18 is opened and closed by a lid 34.

Furthermore, a nozzle portion for piping (not illustrated) for supplying water to each location of an aircraft is provided on an upper portion of the cylindrical portion 14, and a nozzle portion for piping (not illustrated) for discharging water is provided on a lower portion of the cylindrical portion 14.

Figure 1:
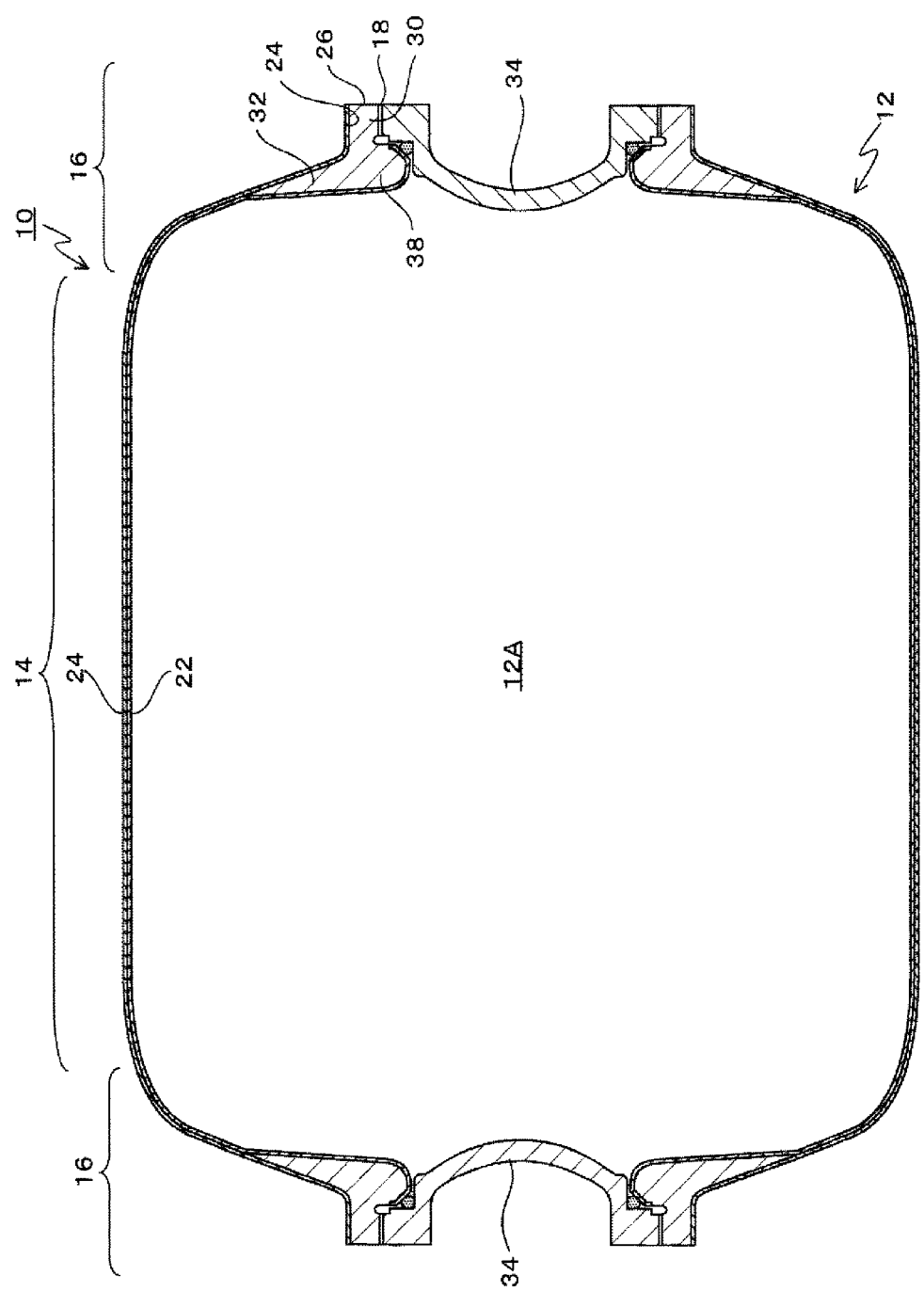
FIG. 1 is a cross-sectional view of an aircraft water tank.

As illustrated in FIG. 1, the tank body 12 includes an innerliner 22 forming the inner surface of the aircraft water tank 10 and a fiber-reinforced resin layer 24 covering the outer surface of the innerliner 22.

The innerliner 22 is a hollow body defining the contour of the aircraft water tank 10 and is formed by blow molding. The blow molding involves melting a synthetic resin into a pipe-like shape, inserting the pipe into a mold, and pumping air into the interior of the pipe to obtain a molded product.

Figure 4:
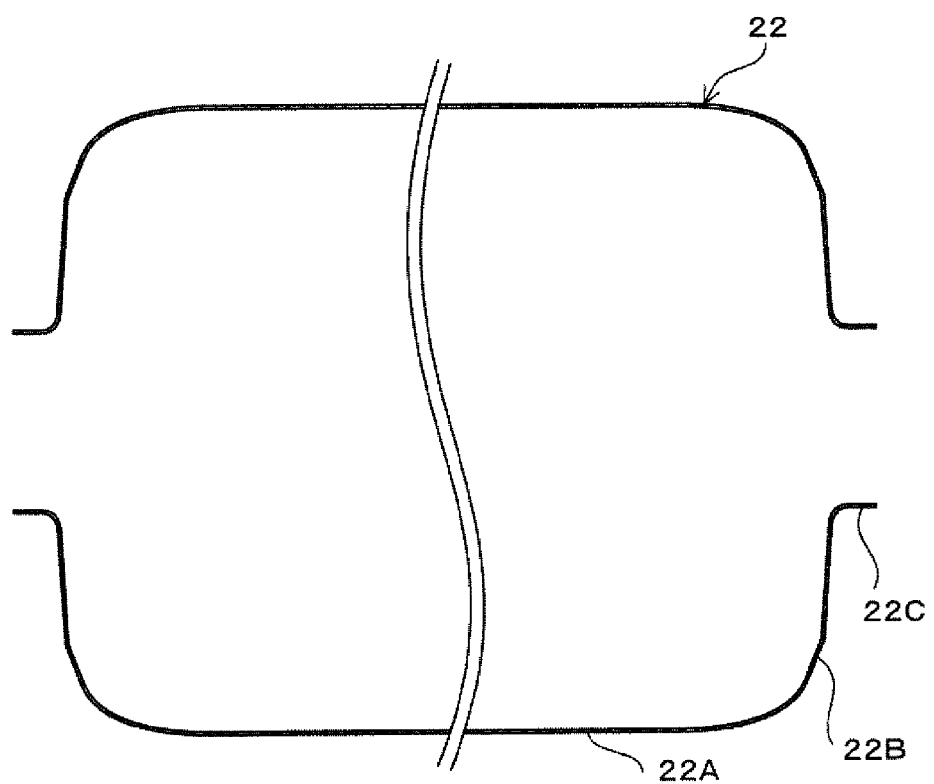
FIG. 4 is a cross-sectional view of an innerliner obtained by blow molding.

As illustrated in FIG. 4, the innerliner 22 obtained by blow molding includes a cylindrical portion 22A, a dome portion 22B provided on either side of the cylindrical portion 22A, and a cylinder portion 22C disposed projecting from the center of the dome portion 22B.

For the innerliner 22, various known FDA approved materials can be used. Examples of such materials include polyolefin resins such as polypropylene and polyethylene which are thermoplastic resins.

The fiber-reinforced resin layer 24 is formed via a filament winding method in which reinforcing fibers (filaments) impregnated with a thermosetting resin are wound around the outer circumferential surface of the innerliner 22.

Various known synthetic resins such as epoxy resin can be used as the thermosetting resin. Various known fibers such as carbon fibers or glass fibers can be used as the reinforcing fibers.

Figure 3:
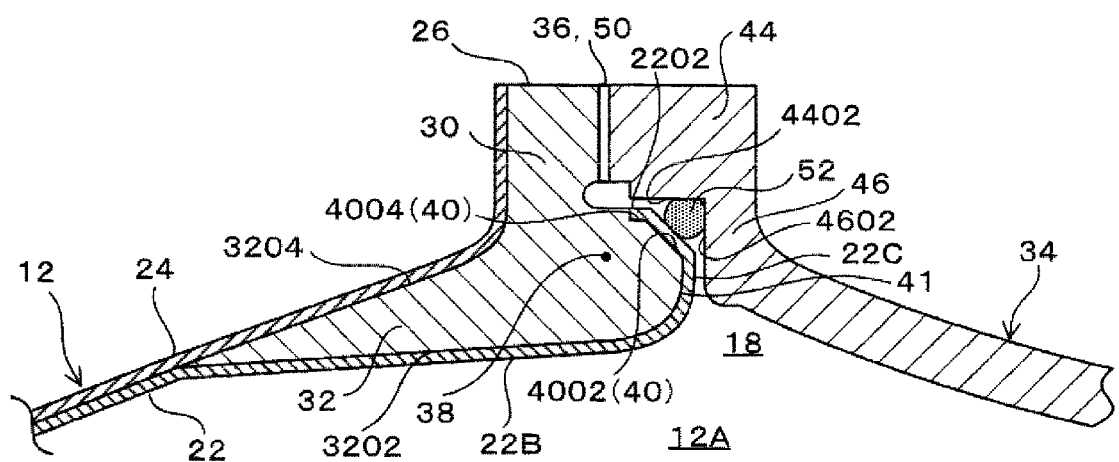
FIG. 3 is an enlarged view of a main portion of a mouthpiece and a lid with the mouthpiece and the lid joined.

Each of the opening portions 18 is formed by an annular mouthpiece 26 attached between an end of the innerliner 22 and an end of the fiber-reinforced resin layer 24. As illustrated in FIG. 3, when the aircraft water tank 10 is in use, the opening portion 18 is sealed by the lid 34.

Figure 5:
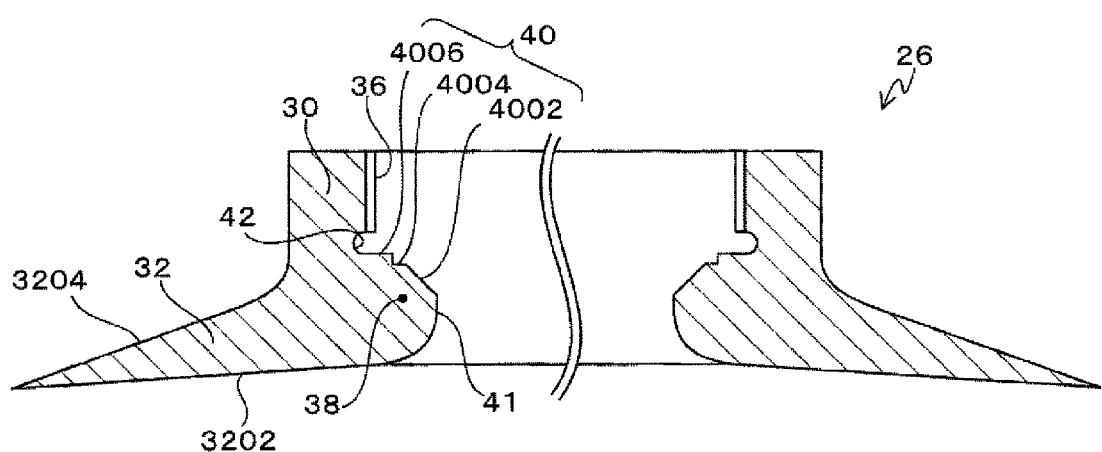
FIG. 5 is a cross-sectional view of a mouthpiece.

As illustrated in FIG. 5, the mouthpiece 26 includes a cylinder-like portion 30 centrally disposed in the dome portion 16, a skirt portion 32, and a bulging portion 38.

A female thread 36 is provided on the inner circumferential portion of a first end of the cylinder-like portion 30 in the axial direction. The female thread 36 is the mouthpiece side joining portion on the mouthpiece side to which the lid 34 joins to.

The skirt portion 32 extends outward in the radial direction of the cylinder-like portion 30 from the entire circumference of the outer circumferential portion of a second end of the cylinder-like portion 30 in the axial direction.

The bulging portion 38 bulges inward in the radial direction from the entire circumference of the inner circumferential portion of the second end of the cylinder-like portion 30 in the axial direction. The bulging portion 38 bulges inward in the radial direction further than the inner diameter of the female thread 36.

The bulging portion 38 includes a first annular surface 40 that faces the first end side of the cylinder-like portion 30 in the axial direction and includes an inner circumferential surface 41 that continues on from the inner circumferential end of the first annular surface 40.

The first annular surface 40 includes an inclined surface 4002, an annular surface 4004, and a flat surface 4006.

The inclined surface 4002 is formed with a conical surface with an inner diameter gradually increasing toward the first end side in the axial direction of the cylinder-like portion 30, and the second end of the inclined surface 4002 in the axial direction is connected to the inner circumferential surface 41.

The annular surface 4004 is connected to a first end of the inclined surface 4002 in the axial direction and is formed in an annular shape with a flat surface orthogonal to the axial direction with an outer diameter greater than the inner diameter of the first end of the inclined surface 4002.

The flat surface 4006 is formed with an annular flat surface orthogonal to the axial direction located outward in the radial direction of the annular surface 4004 at a position of the bulging portion 38 separated from the annular surface 4004 to the first end side in the axial direction by a distance corresponding to the thickness of the innerliner 22.

In addition, a groove 42 that includes an inner circumferential surface with dimensions greater than the major diameter of the female thread 36 is formed at a position of the inner circumferential portion of the cylinder-like portion 30, the position where the female thread 36 and the bulging portion 38 meet.

Of the pair of opposing side surfaces of the groove 42, the side surface on the bulging portion 38 side is flush with the flat surface 4006.

The skirt portion 32 is formed so that the outer diameter increases gradually in the direction away from the bulging portion 38 and the wall thickness decreases.

The skirt portion 32 includes a second annular surface (inner skirt surface) 3202 facing the direction opposite to that of the first end of the cylinder-like portion 30 in the axial direction and an outer skirt surface 3204 facing the first end side of the cylinder-like portion 30 in the axial direction.

Figure 10:
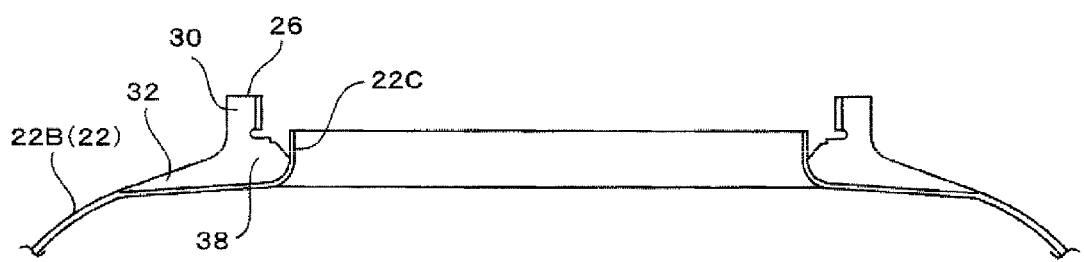
FIG. 10 is an explanatory diagram illustrating a state in which the mouthpiece is placed on the surface of the dome portion near the cylinder portion of the innerliner according to the first embodiment.

As illustrated in FIG. 10, the inner circumferential end of the inner skirt surface 3202 is connected to the inner circumferential surface 41, and the inner skirt surface 3202 and the inner circumferential surface 41 have a shape that conforms to the central portion of the dome portion 22B of the innerliner 22 and the base portion of the cylinder portion 22C and are designed so that the innerliner 22 described below can be smoothly attached from the inner skirt surface 3202 to the surface of the bulging portion 38.

As illustrated in FIG. 2, the fiber-reinforced resin layer 24 is attached from the cylindrical portion 22A of the innerliner 22 and the dome portion 22B to the outer skirt surface 3204 of the mouthpiece 26 and the outer circumferential surface of the cylinder-like portion 30.

The innerliner 22 is thermally deformed with a section of the dome portion 22B near the cylinder portion 22C abutted against the second annular surface 3202 and attached by an adhesive and with the cylinder portion 22C abutted against the first annular surface 40.

An end portion 2202 of the thermally deformed innerliner 22 is located on the annular surface 4004 further inward in the radial direction than the inner diameter of the female thread 36. Accordingly, when the cylinder portion 22C is thermally deformed on the first annular surface 40, whether the innerliner 22 is securely abutted against the first annular surface 40 and attached thereto can be easily visually confirmed from the inner side of the female thread 36. This configuration allows manufacturing efficiency to be improved.

The lid 34 includes a ring plate portion 44, a cylinder portion 46 disposed projecting from the inner circumferential portion of one end surface of the ring plate portion 44 in the thickness direction, and an end surface portion 48 that connects the end of the cylinder portion 46.

A male thread 50 is formed on the outer circumferential portion of the ring plate portion 44. The male thread 50 is the lid side joining portion to which the mouthpiece side joining portion joins and can engage with the female thread 36.

Furthermore, in the present embodiment, an O-ring 52 is installed as a sealing member at a section on the outer circumferential surface of the cylinder portion 46 near the end surface. By installing the O-ring 52 on the lid 34, the opening and closing operation of the opening portion 18 via the lid 34 can be simplified.

Note that in the present embodiment, the mouthpiece 26 and the lid 34 are formed of the same synthetic resin material as the FDA approved material, and the male thread 50 and the female thread 36 can smoothly be joined together.

As illustrated in FIG. 3, with the lid 34 joined to the opening portion 18 via engagement of the male thread 50 with the female thread 36, the O-ring 52 is compressed between the portion of the lid 34 projecting toward the inside of the tank body 12 from the female thread 36 and the portion of the innerliner 22 located at the inclined surface 4002. This allows the opening portion 18 to be sealed in a liquid-tight manner and for a sealed water containment space 12A to be formed inside the tank body 12.

In the present embodiment, the portion of the lid 34 that compresses the O-ring 52 is a corner portion formed by an end surface 4402 of the ring plate portion 44 and an outer circumferential surface 4602 of the cylinder portion 46. The portion of the innerliner 22 that compresses the O-ring 52 is the portion located at the inclined surface 4002.

The end portion 2202 of the innerliner 22 attached to the surface of the bulging portion 38 is located at a section on the surface of the bulging portion 38 further away from the water containment space 12A than where the O-ring 52 is compressed.

According to such an aircraft water tank 10, with the opening portion 18 sealed by the lid 34, the second annular surface 3202 of the skirt portion 32 of the mouthpiece 26 and the surface of the bulging portion 38 located in the drinking water are covered by the innerliner 22, and the end portion 2202 of the innerliner 22 is located on the surface of the bulging portion 38 further away from the water containment space 12A than the O-ring 52 that seals the inside of the tank body 12 in a liquid-tight manner. In other words, the end portion 2202 of the innerliner 22 is positioned outside the water containment space 12A.

Thus, when the aircraft water tank 10 is in use, water contained inside the tank body 12 does not come into contact with the end portion 2202 of the innerliner 22. That is, the water does not come into contact with the mouthpiece 26 and/or the adhesive for attaching the innerliner 22 to the mouthpiece 26.

As a result, the coating operation to prevent water leakage using an FDA approved material on the surface (second annular surface 3202) of the skirt portion 32 around the end portion 2202 of the innerliner 22 can be omitted. This has the advantage of increasing the manufacturing efficiency of the aircraft water tank 10 and reducing costs. Furthermore, at the time of maintenance, the operation of inspecting and repairing the coating for preventing water leakage using an FDA approved material can be omitted. This has the advantage of increasing the efficiency of maintenance work.

Furthermore, when the aircraft water tank 10 is in use, the second annular surface 3202 and the surface of the bulging portion 38 of the mouthpiece 26 located in the drinking water are covered by the innerliner 22. Thus, the mouthpiece 26 and the drinking water do not come into direct contact with one another.

Accordingly, in manufacturing the mouthpiece 26, the material used is not restricted to an FDA approved material and desired materials with various properties can be used. This has the advantage of increasing the degree of freedom in design.

Next, an attaching device for attaching the innerliner 22 and the mouthpiece 26 of such an aircraft water tank together will be described.

As illustrated in FIGS. 6 to 9, an attaching device 54 includes an upper mold 56, a lower mold 58, and a biasing portion 60.

The upper mold 56 includes an upper mold body 62 and a heating portion 64.

The upper mold 56 is formed of a material with rigidity. As such a material, various known materials that include a metal can be employed. In the present embodiment, an aluminum alloy is used.

Figure 11A:
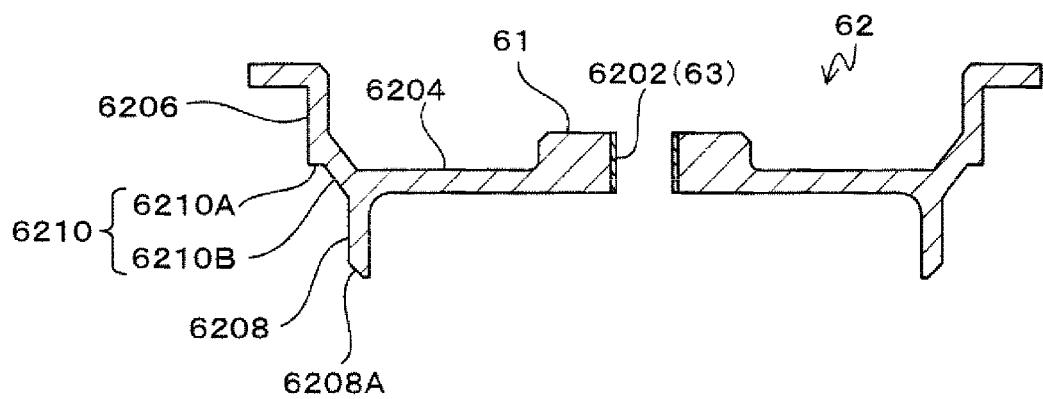
FIG. 11A is a cross-sectional view of an upper mold body according to the first embodiment.
Figure 11B:
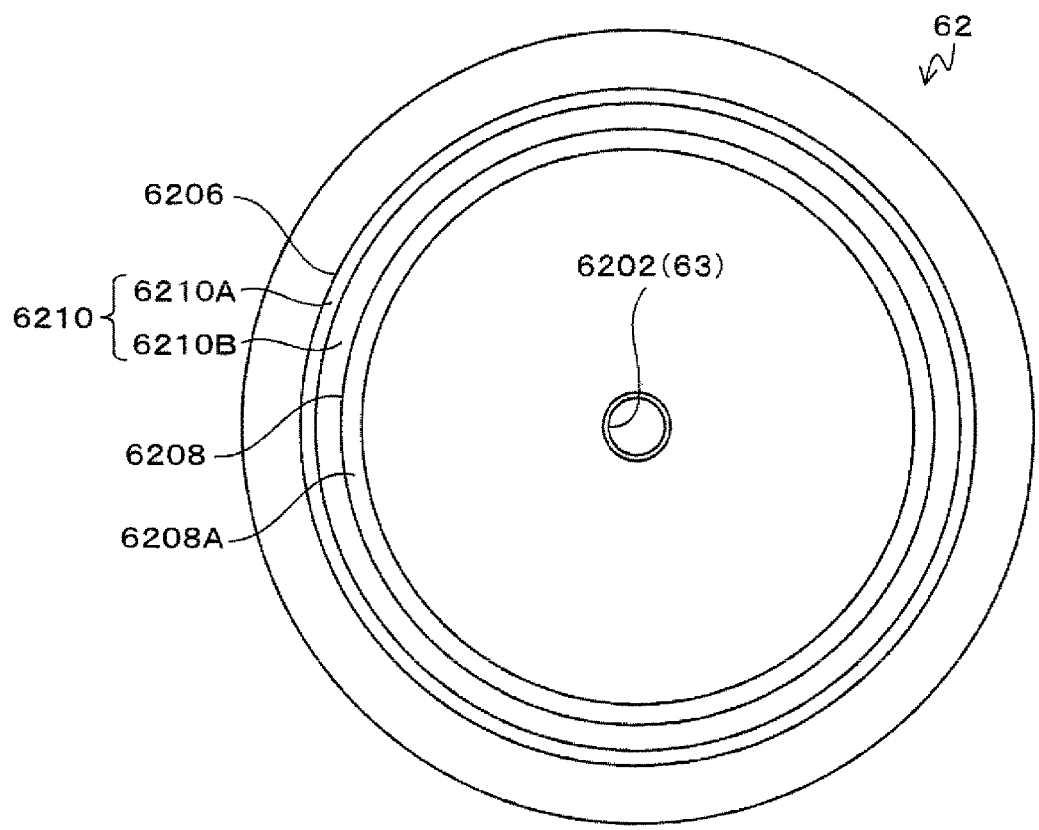
FIG. 11B is a bottom view of FIG. 11A.

As illustrated in FIGS. 11A and 11B, the upper mold body 62 has a substantially disk-like shape. A shaft insertion hole 6202, a heating portion containing recess portion 6204, an upper cylindrical surface portion 6206, an upper mold side positioning cylindrical surface 6208, and an outer abutting surface 6210 are provided on the upper mold body 62. The shaft insertion hole 6202, the upper cylindrical surface portion 6206, the upper mold side positioning cylindrical surface 6208, and the outer abutting surface 6210 are coaxially located.

The shaft insertion hole 6202 is formed in the inner circumferential surface of a bearing 63 fitted to a boss portion 61 of a central portion of the upper mold body 62. The axial center of the upper mold body 62 and the axial center of the bearing 63 are aligned with one another. The shaft insertion hole 6202, together with a shaft member 70 described below, functions to position the upper mold 56 and the lower mold 58 in a coaxial manner, and the bearing 63 rotatably supports the shaft member 70.

The heating portion containing recess portion 6204 is provided on the upper surface of the upper mold body 62 and extends in the circumferential direction. The heating portion 64 is contained by the heating portion containing recess portion 6204 and heats the outer abutting surface 6210. Various known heating members such as electric heaters can be used as the heating portion 64.

The upper cylindrical surface portion 6206 is formed on the upper portion of the upper mold body 62 with an outer circumferential surface with an outer diameter less than the inner diameter of the female thread 36.

The upper mold side positioning cylindrical surface 6208 is formed on the lower portion of the upper mold body 62 with an outer circumferential surface with an outer diameter less than the upper cylindrical surface portion 6206, or in other words, formed with a cylindrical surface with the axial center of the upper mold body 62 as its center. The upper mold side positioning cylindrical surface 6208 functions to position the upper mold 56 and the lower mold 58 in a coaxial manner.

An inclined surface 6208A is formed on the lower end of the upper mold side positioning cylindrical surface 6208. The outer diameter of the inclined surface 6208A gradually decreases downwards. The inclined surface 6208A facilitates the smooth engagement of the upper mold side positioning cylindrical surface 6208 and a lower mold side positioning cylindrical surface 5804 to be described below.

The outer abutting surface 6210 is a section that abuts the cylinder portion 22C of the innerliner 22 against the first annular surface 40 of the mouthpiece 26 and connects together the lower end of the upper cylindrical surface portion 6206 and the upper end of the upper mold side positioning cylindrical surface 6208.

The outer abutting surface 6210 includes a first abutting surface 6210A that abuts the end portion 2202 of the cylinder portion 22C against the annular surface 4004 and a second abutting surface 6210B that abuts the section of the cylinder portion 22C following on from the end portion 2202 against the inclined surface 4002.

The first abutting surface 6210A is formed with an annular flat surface with an outer diameter that is greater than that of the annular surface 4004, abuts the end portion 2202 of the cylinder portion 22C against the annular surface 4004, and to itself abuts the flat surface 4006.

The second abutting surface 6210B is formed by the inclined surface 4002 that has an outer diameter that gradually decreases from the inner circumferential end of the first abutting surface 6210A toward the upper mold side positioning cylindrical surface 6208 and is a conical surface in the present embodiment.

When viewed in the axial direction of the upper mold 56, the second abutting surface 6210B extends such that the lower end is located on the inner side of a section of the inner circumferential end of the inclined surface 4002 of the mouthpiece 26 plus the thickness of the innerliner 22 in the radial direction of the upper mold 56.

As illustrated in FIGS. 6 to 9, the lower mold 58 is coaxially disposed with the upper mold 56 under the upper mold 56.

The lower mold 58 includes an inner abutting surface 5802 and the lower mold side positioning cylindrical surface 5804.

The inner abutting surface 5802 is the section that abuts the section of the dome portion 22B near the cylinder portion 22C against the second annular surface 3202 to attach the two via an adhesive.

The lower mold side positioning cylindrical surface 5804 is formed with a cylindrical surface with the axial center of the lower mold 58 as a center axis and is capable of engaging with the upper mold side positioning cylindrical surface 6208.

By the lower mold side positioning cylindrical surface 5804 and the upper mold side positioning cylindrical surface 6208 engaging, the upper mold 56 and the lower mold 58 are coaxially positioned.

By the shaft member 70 being inserted into the bearing 63, the upper mold 56 and the lower mold 58 are coaxially positioned, and by the lower mold side positioning cylindrical surface 5804 and the upper mold side positioning cylindrical surface 6208 engaging, the upper mold 56 and the lower mold 58 are coaxially positioned. In the present embodiment, by the shaft member 70 being inserted into the bearing 63, the upper mold 56 and the lower mold 58 are coaxially positioned, and by the lower mold side positioning cylindrical surface 5804 and the upper mold side positioning cylindrical surface 6208 engaging, the upper mold 56 and the lower mold 58 are coaxially positioned in a supplementary manner. Accordingly, the lower mold side positioning cylindrical surface 5804 and the upper mold side positioning cylindrical surface 6208 can be omitted.

The section of the lower mold 58 that includes the lower mold side positioning cylindrical surface 5804 is formed of a material with a lower thermal conductivity than that of the upper mold 56.

In the present embodiment, the lower mold 58 includes a plate portion 66 and an outer circumferential member 68.

The plate portion 66 is formed of a disk-like member with a uniform thickness that has an outer diameter that corresponds to the outer diameter of the second annular surface 3202.

The plate portion 66 is formed of a material with rigidity. As such a material, various known materials that include a metal can be employed. In the present embodiment, an aluminum alloy is used.

The outer circumferential member 68 is detachably attached to the outer circumferential portion of the plate portion 66 by a screw N.

The outer circumferential member 68 is formed of a material with a lower thermal conductivity than that of the upper mold 56, with rigidity, and with a higher heat resistance than that of the innerliner 22.

Various known materials such as fluororesins can be employed as such a material with rigidity, with heat resistance, and with a low thermal conductivity.

The outer circumferential member 68 has a ring plate shape, and the inner circumferential surface is formed as the lower mold side positioning cylindrical surface 5804, which is capable of engaging with the upper mold side positioning cylindrical surface 6208.

The upper surface of the outer circumferential member 68 is formed as the inner abutting surface 5802.

As illustrated in FIGS. 6 to 9, the portion of the outer circumferential member 68 near the inner circumferential end is formed as an upright portion 6802 that rises upward conforming to the inner circumferential surface 41 of the bulging portion 38 of the mouthpiece 26 located outward of the upper mold side positioning cylindrical surface 6208 in the radial direction.

The shaft member 70 is disposed projecting from the center of the plate portion 66 in the axial direction of the lower mold 58.

The shaft member 70 is inserted into a bearing 67 fit to the center of the plate portion 66.

When the innerliner 22 and the mouthpiece 26 are attached to one another, the shaft member 70 is inserted into the shaft insertion hole 6202 of the bearing 63 of the upper mold 56.

The biasing portion 60 includes a coil spring 72 installed around the shaft member 70 that biases the upper mold body 62 toward the lower mold 58.

That is, one end of the coil spring 72 abuts the upper surface of the inner circumferential portion of the upper mold body 62, and the other end of the coil spring 72 abuts a nut 74 fit to the shaft member 70.

By rotating the nut 74, the compression length of the coil spring 72 is adjusted, and the force of pressing the upper mold body 62 against the lower mold 58 is adjusted.

In the present embodiment, an end portion of the mouthpiece 26 on one side in the axial direction corresponds to sealed space inward of the dome portion 22B and the cylindrical portion 22A of the innerliner 22.

As such, as illustrated in FIGS. 12 to 15, the lower mold 58 includes two sections 58A, 58B. The two sections 58A, 58B are inserted inside the innerliner 22 from the inner side of the mouthpiece 26 in a folded state. Then, the two sections 58A, 58B are opened inside the innerliner 22.

In other words, as illustrated in FIGS. 12A to 12D and FIGS. 13A and 13B, the plate portion 66 includes two plate sections 66A, 66B coupled together and swingable via a hinge 78 between an open state in which the plate sections 66A, 66B open flat and a folded state in which the plate sections 66A, 66B are folded in a direction toward one another.

The plate section 66A of the two plate sections 66A, 66B is provided with a thick cylindrical boss portion 6602 located in the center of the plate portion 66. The bearing 67 fits in the hole of the cylindrical boss portion 6602.

Additionally, the plate section 66B of the two plate sections 66A, 66B is provided with a semicircular arc-shaped missing portion 6604 that is capable of engaging with the cylindrical boss portion 6602.

Figure 13A:
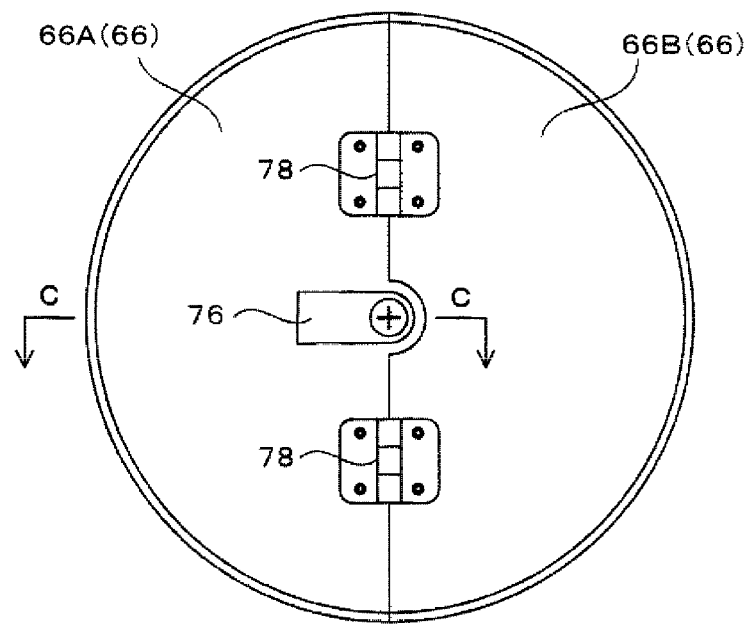
FIGS. 13A and 13B are explanatory diagrams of a holding member and the two plate sections as viewed from below.
Figure 13B:
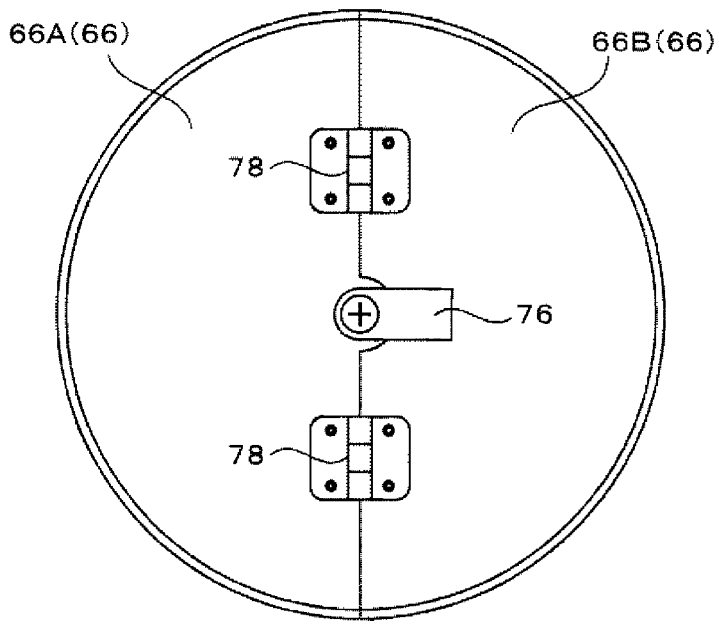
Figure 13C:
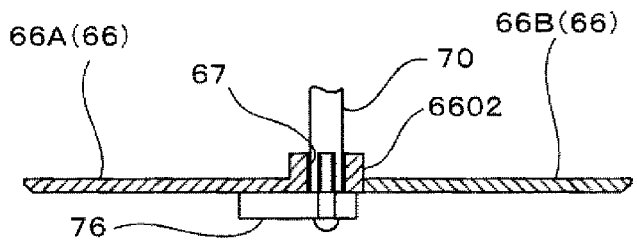
FIG. 13C is a cross-sectional view along line C-C of FIG. 13A.
Figure 14A:
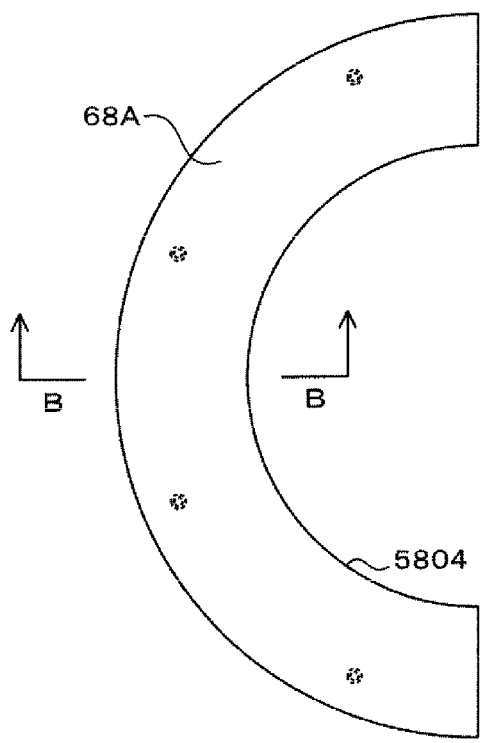
FIG. 14A is a plan view of one of the outer circumferential members according to the first embodiment.
Figure 14B:
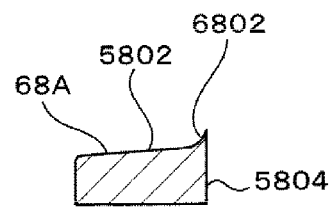
FIG. 14B is a cross-sectional view along line B-B of FIG. 14A.
Figure 14C:
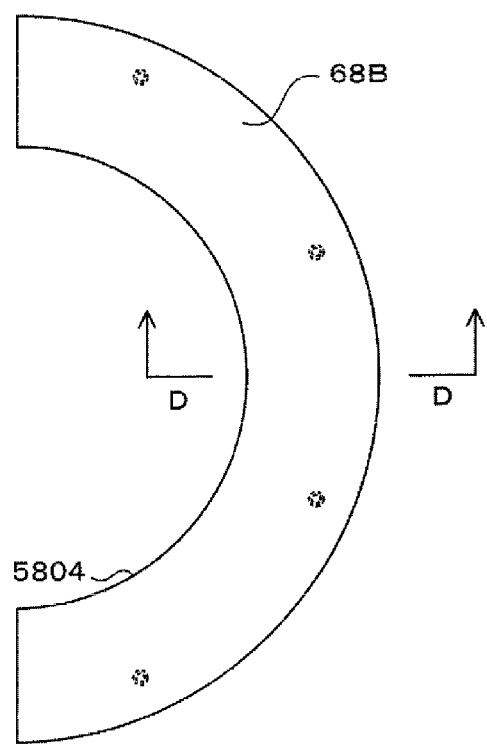
FIG. 14C is a plan view of the other outer circumferential member.
Figure 14D:
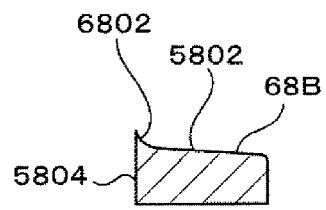
FIG. 14D is a cross-sectional view along line D-D of FIG. 14C.

As illustrated in FIG. 13C, the shaft member 70 is inserted into the bearing 67 and supported by the bearing 67 in a rotatable manner, and a holding member 76 is attached in a manner so that it integrally rotates with the shaft member 70.

As illustrated in FIGS. 13A and 13C, when the two plate sections 66A, 66B are folded, the holding member 76 corresponds to a first position (first rotational position) located only under the plate section 66A provided with the shaft member 70. In the open state, as illustrated in FIG. 13B, the holding member 76 corresponds to a second position (second rotational position) 180 degrees rotated from the first position and extending across the lower surface of both of the plate sections 66A, 66B and functions to maintain the open state.

In other words, in the present embodiment, the holding portion that enables the two plate sections 66A, 66B to be held in an open state is composed of the holding member 76.

As illustrated in FIGS. 14A to 14D, the outer circumferential member 68 includes outer circumferential sections 68A, 68B provided on the outer circumferential portion of the two plate sections 66A, 66B.

Half of each of the inner abutting surface 5802 and the lower mold side positioning cylindrical surface 5804 is formed each of the outer circumferential sections 68A, 68B.

When the two plate sections 66A, 66B are in an open state, the inner abutting surface 5802 and the lower mold side positioning cylindrical surface 5804 are formed from the outer circumferential sections 68A, 68B attached to the plate sections 66A, 66B.

Next, a process of attaching the innerliner 22 and the mouthpiece 26 together using the attaching device 54 will be described.

As illustrated in FIG. 4, the innerliner 22 formed by blow molding includes the cylindrical portion 22A, the dome portion 22B on either side of the cylindrical portion 22A, and the cylinder portion 22C disposed projecting from the center of the dome portion 22B.

Firstly, as illustrated in FIG. 10, an adhesive is applied to the surface of the dome portion 22B near the cylinder portion 22C, and the mouthpiece 26 is placed on the surface of the dome portion 22B near the cylinder portion 22C so that the cylinder portion 22C is inserted on the inner side of the bulging portion 38.

Next, the lower mold 58 is inserted inside the dome portion 22B from the inner side of the cylinder portion 22C.

Figure 15A:
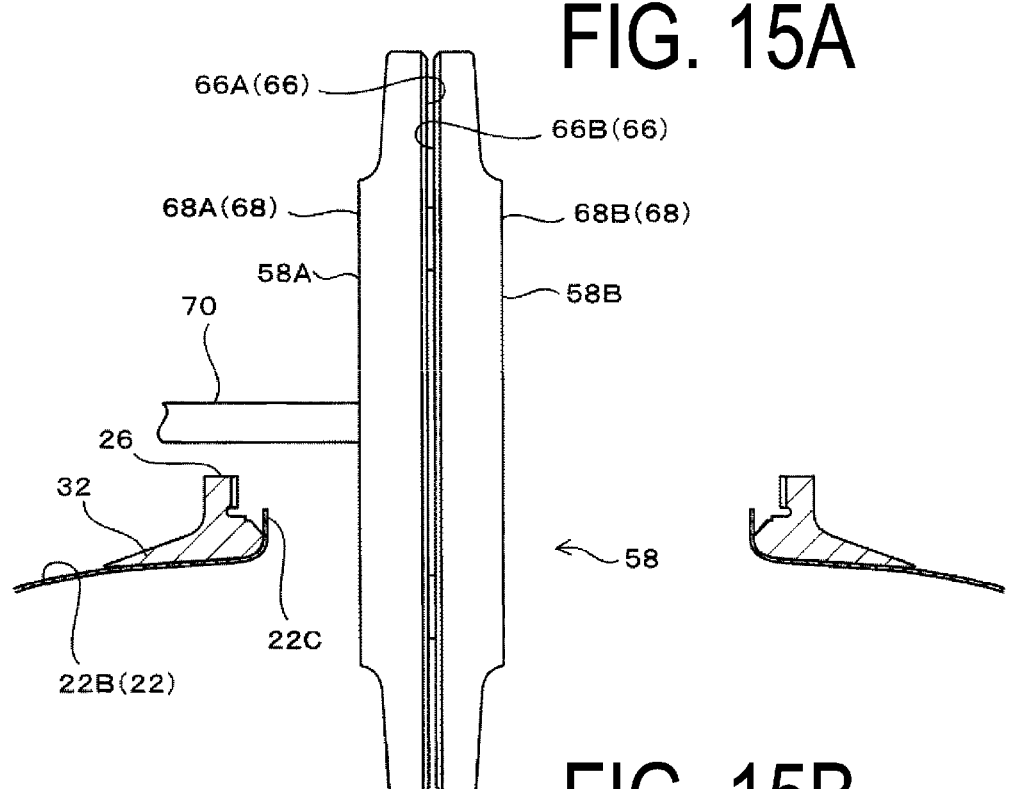
FIG. 15A is an explanatory diagram illustrating a state in which the lower mold in a folded state is inserted inside the innerliner from the inner side of the mouthpiece according to the first embodiment.
Figure 15B:
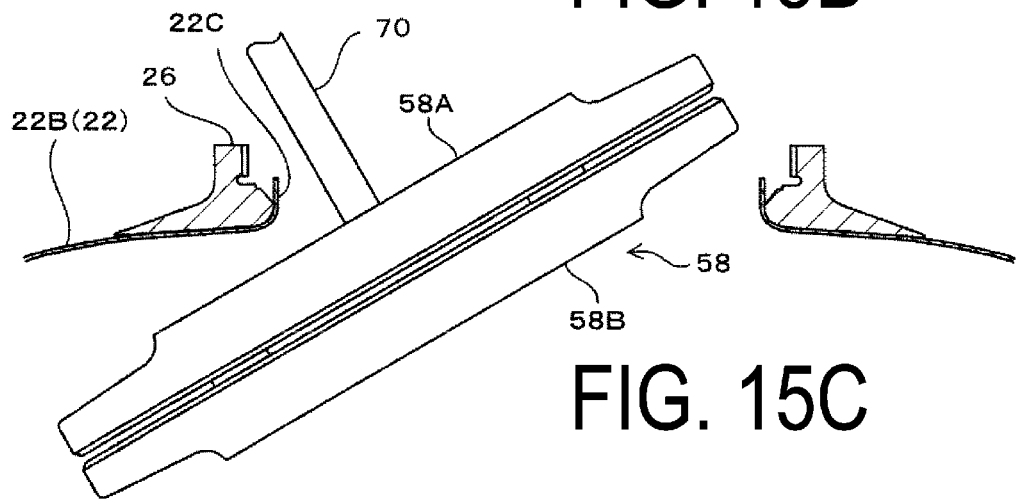
FIG. 15B is an explanatory diagram illustrating a state in which the lower mold in a folded state is further inserted inside the innerliner.
Figure 15C:
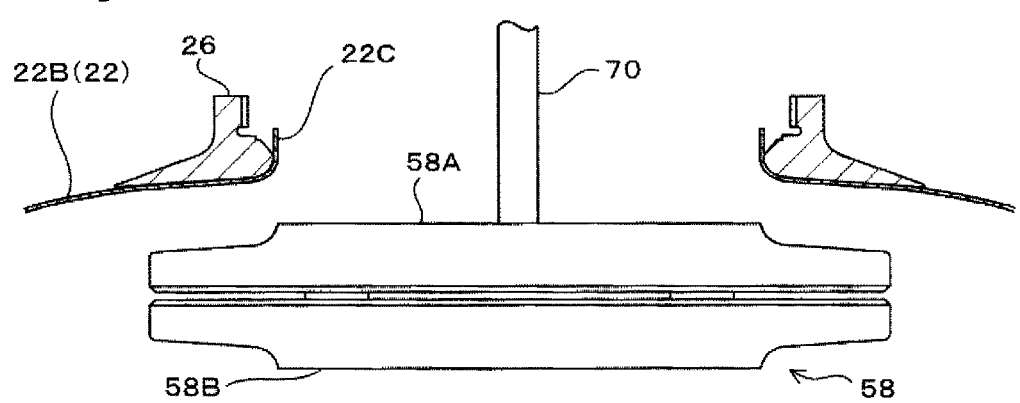
FIG. 15C is an explanatory diagram illustrating a state just prior to when the lower mold in a folded state is opened inside the innerliner.

As illustrated in FIGS. 15A, 15B, and 15C, the lower mold 58 is inserted inside the innerliner 22 from the inner side of the cylinder portion 22C via the shaft member 70 with the two plate sections 66A, 66B in a folded state.

Next, a worker inserts his/her hand from the inner side of the cylinder portion 22C to open the two plate sections 66A, 66B, and as illustrated in FIG. 13B, the worker rotates the holding member 76 via the shaft member 70 and engages the holding member 76 so that the two plate sections 66A, 66B are held in an open state.

Figure 6:
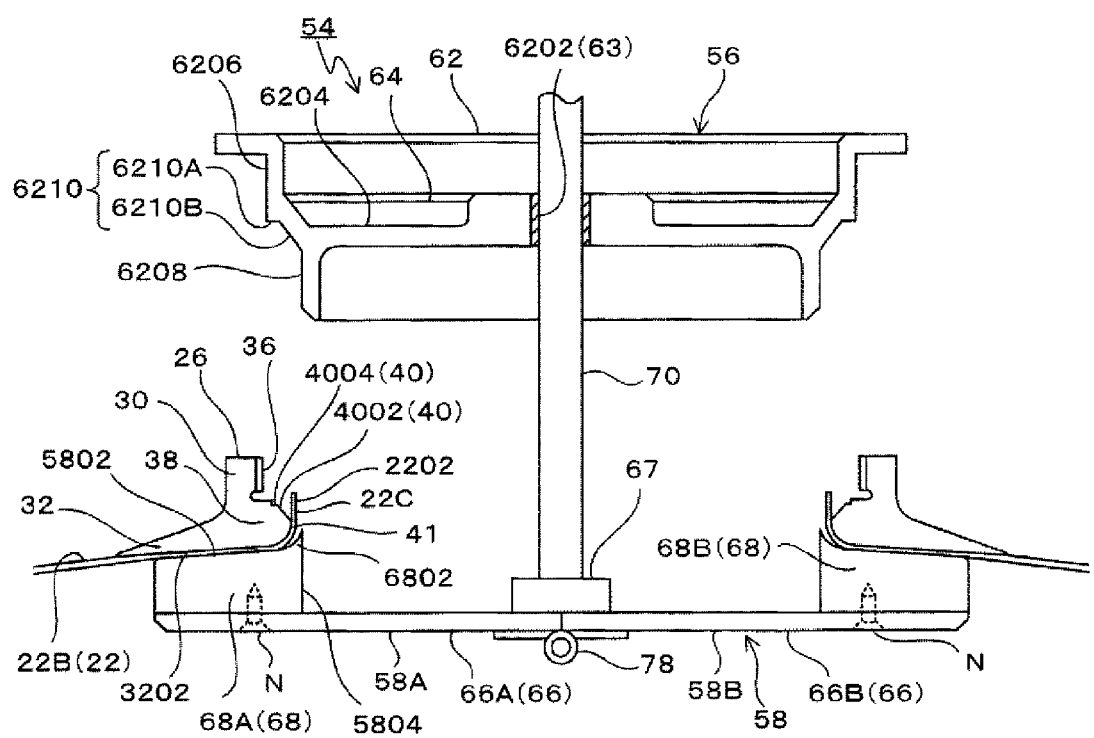
FIG. 6 is an explanatory diagram illustrating an open state of the lower mold inside the innerliner according to a first embodiment.

As illustrated in FIG. 6, the inner abutting surface 5802 of the lower mold 58 is abutted against the portion of the innerliner 22 abutted against the second annular surface 3202.

Figure 7:
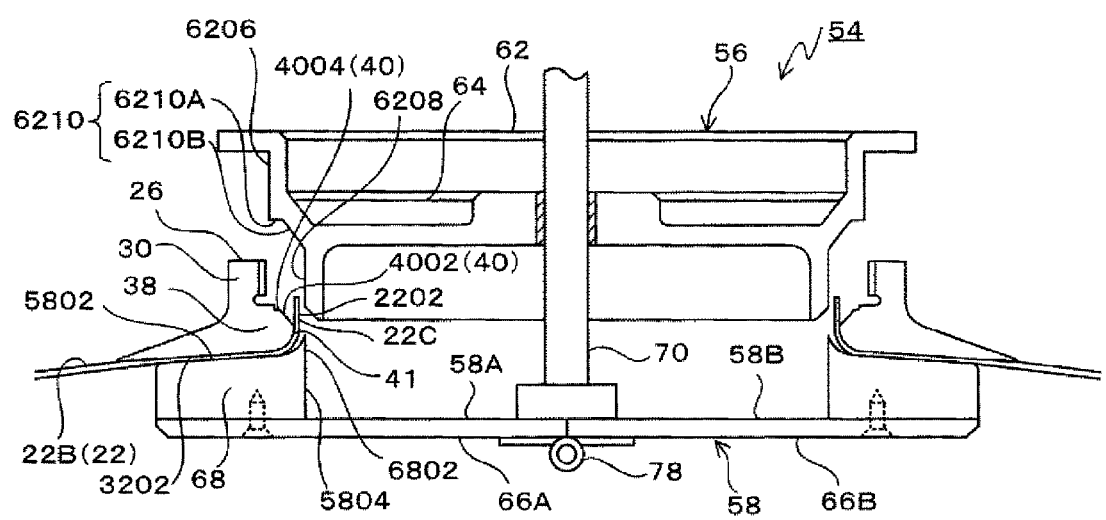
FIG. 7 is an explanatory diagram illustrating a state with the upper mold brought close to the lower mold according to the first embodiment.
Figure 8:
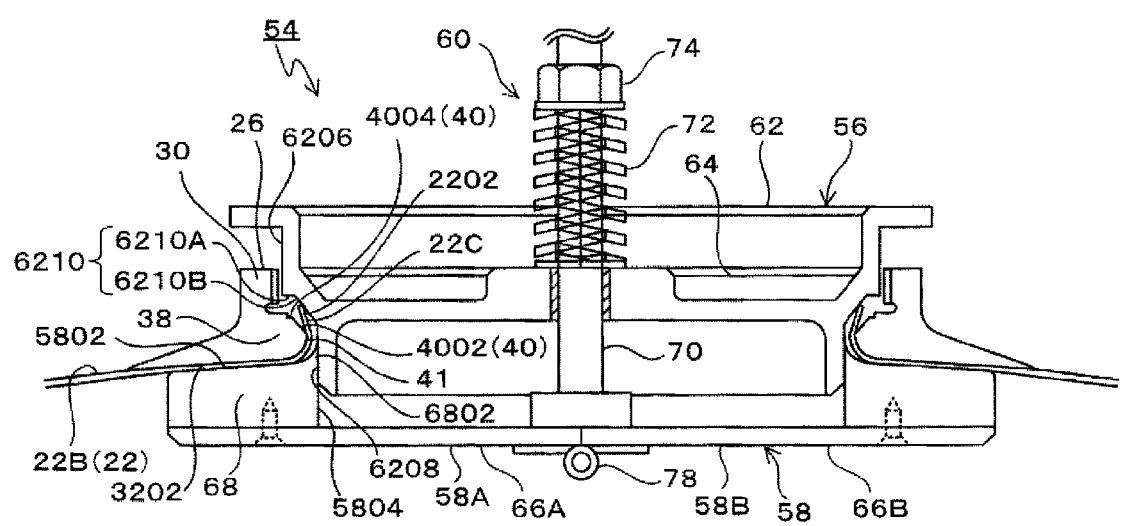
FIG. 8 is an explanatory diagram illustrating a state in which a coil spring is installed around a shaft member and a nut is engaged with the shaft member according to the first embodiment.

Next, as illustrated in FIGS. 6 to 8, the upper mold 56 is inserted on the shaft member 70, and the upper mold side positioning cylindrical surface 6208 of the upper mold 56 is inserted into the cylinder portion 22C of the innerliner 22.

Next, the coil spring 72 and the nut 74 are disposed above the upper mold 56, and the outer abutting surface 6210 of the upper mold 56 is heated via the heating portion 64.

Then, the nut 74 is rotated to adjust the elastic force of the coil spring 72 acting in the direction for the upper mold 56 to move toward the lower mold 58.

Figure 9:
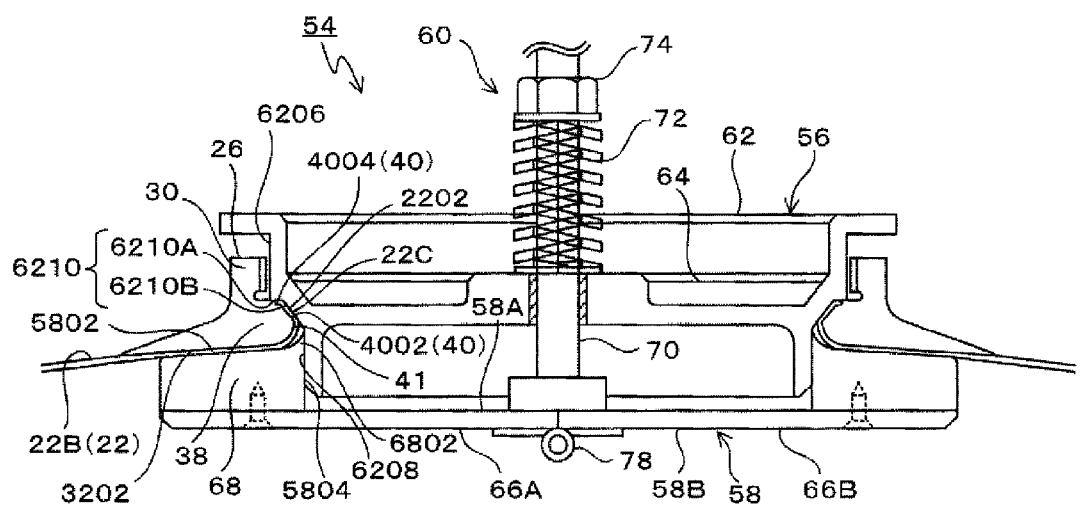
FIG. 9 is an explanatory diagram illustrating a state in which a section of the mouthpiece between an outer bulging surface and an inner skirt surface is sandwiched by the inner abutting surface of the lower mold and the outer abutting surface of the upper mold being biased by the elastic force of the coil spring according to the first embodiment.

As illustrated in FIG. 9, the elastic force of the coil spring 72 biases the upper mold 56 and the lower mold 58 in a direction toward one another, and the outer abutting surface 6210 of the upper mold 56 abuts the cylinder portion 22C of the innerliner 22 against the first annular surface 40 of the mouthpiece 26.

Specifically, the second abutting surface 6210B of the upper mold 56 thermally deforms the cylinder portion 22C outward in the radial direction so that the cylinder portion 22C abuts against the inclined surface 4002 of the mouthpiece 26.

Additionally, the first abutting surface 6210A of the upper mold 56 thermally deforms the end portion 2202 of the cylinder portion 22C outward in the radial direction so that the end portion 2202 of the cylinder portion 22C abuts against the annular surface 4004.

Furthermore, the elastic force of the coil spring 72 makes the inner abutting surface 5802 of the outer circumferential member 68 abut the section of the dome portion 22B of the innerliner 22 located near the cylinder portion 22C against the second annular surface 3202 of the mouthpiece 26.

With the elastic force of the coil spring 72 in effect, the abutment of the outer abutting surface 6210 of the upper mold 56 against the first annular surface 40 of the cylinder portion 22C; and the abutment of the inner abutting surface 5802 of the lower mold 58 against the second annular surface 3202 of a section of the dome portion 22B near the cylinder portion 22C are maintained for the required amount of time.

In such processing, by the shaft member 70 being inserted into the bearing 63 of the upper mold 56, and by the upper mold side positioning cylindrical surface 6208 of the upper mold 56 being inserted into the lower mold side positioning cylindrical surface 5804 of the lower mold 58, the upper mold 56 and the lower mold 58 are coaxially positioned.

After the required amount of time has elapsed, the nut 74 is operated, and the nut 74 and the coil spring 72 are removed from the shaft member 70. Then the upper mold 56 is removed.

Next, the lower mold 58 is moved downward from the mouthpiece 26 via the shaft member 70, and the holding member 76 is rotated via the shaft member 70 to put the plate sections 66A, 66B in a foldable state.

Next, the worker inserts his/her hand from the inner side of the cylinder portion 22C, folds up the two plate sections 66A, 66B, and then removes the lower mold 58 to the outside of the innerliner 22 from the inner side of the mouthpiece 26 via the shaft member 70. This completes the process.

According to the present embodiment, the two sections 58A, 58B are inserted inside the innerliner 22 from the inner side of the mouthpiece 26 in a folded state. Then, the two sections 58A, 58B are opened inside the innerliner 22, and the holding member 76 holds the two sections 58A, 58B in an open state.

In other words, the lower mold 58 can be disposed in the space of the innerliner 22 sealed from the inner side of the mouthpiece 26, and the abutment of the outer abutting surface 6210 of the upper mold 56 against the first annular surface 40 of the cylinder portion 22C and the abutment of the inner abutting surface 5802 of the lower mold 58 against the second annular surface 3202 of a section of the dome portion 22B near the cylinder portion 22C can be performed.

Accordingly, the cylinder portion 22C of the innerliner 22 can be reliably thermally deformed to conform to the first annular surface 40 of the mouthpiece 26, and the inner circumferential portion of the dome portion 22B can be reliably attached to the skirt portion 32 by an adhesive.

Additionally, the shaft member 70 is provided on the section 58A that constitutes the lower mold 58. This is advantageous in that the upper mold 56 and the lower mold 58 can be easily and reliably coaxially positioned and in that the operation of inserting the two sections 58A, 58B in a folded state inside the innerliner 22 from the inner side of the mouthpiece 26 can be easily and efficiently performed.

Additionally, the biasing portion 60 is provided that biases the upper mold 56 in a direction toward the lower mold 58. This is advantageous in that the section of the mouthpiece 26 between by the first annular surface 40 and the second annular surface 3202 can be sandwiched for a predetermined amount of time by the inner abutting surface 5802 and the outer abutting surface 6210 with the innerliner 22 disposed therebetween, the cylinder portion 22C of the innerliner 22 can be reliably thermally deformed to conform to the first annular surface 40 of the mouthpiece 26, and the inner circumferential portion of the dome portion 22B can be reliably attached to the skirt portion 32 via an adhesive.

Furthermore, in another embodiment, a link mechanism or an air cylinder may be used instead of the biasing portion 60. In the state illustrated in FIG. 8, the mouthpiece 26 and the upper mold 56 are supported in a manner not allowing movement upward. Thus, for example, a link mechanism or an air cylinder can be used for moving the shaft member 70 upward. The configuration of the biasing portion 60 is not limited to those of the embodiments, and a configuration from various known configurations can be employed. However, the biasing portion 60 including the coil spring 72, as in the embodiments, is advantageous in simplifying the structure of the biasing portion 60, reducing the number of parts, and reducing the cost of the device.

Note that the holding member 76 may be provided in a manner allowing it to slide between a first position and a second position. However, as in the present embodiment, providing the holding member 76 in a manner allowing it to integrally rotate with the shaft member 70 is advantageous in that the holding member 76 can simply rotate inside the innerliner 22 and that the time required to forming can be reduced.

Second Embodiment

Next, a second embodiment will be described.

Note that in this embodiment, components identical to those of the first embodiment have identical reference signs to those of the first embodiment, and detailed descriptions thereof are omitted.

As illustrated in FIGS. 16 to 19, an attaching device 80 of the second embodiment includes the upper mold 56, the lower mold 58, and the biasing portion 60.

The upper mold 56 includes the upper mold body 62 and the heating portion 64.

Figure 20A:
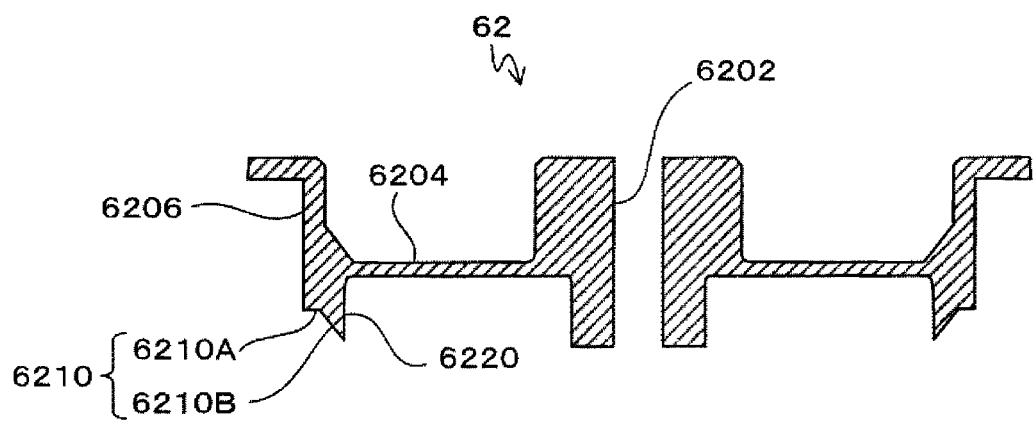
FIG. 20A is a cross-sectional view of an upper mold body according to the second embodiment.
Figure 20B:
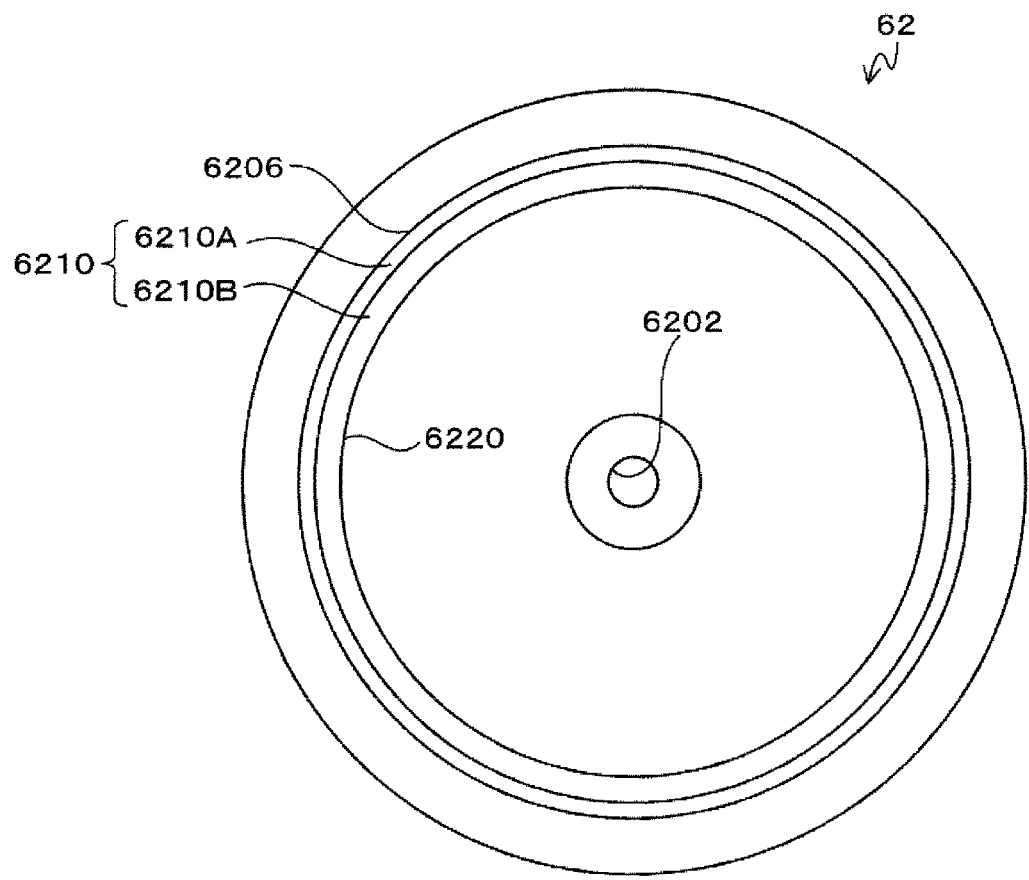
FIG. 20B is a bottom view of FIG. 20A.

The material of the upper mold body 62 is the same as that in the first embodiment. As illustrated in FIGS. 20A and 20B, the shaft insertion hole 6202, the heating portion containing recess portion 6204, the upper cylindrical surface portion 6206, an upper mold side positioning cylindrical surface 6220, and the outer abutting surface 6210 are provided on the upper mold body 62. The shaft insertion hole 6202, the upper cylindrical surface portion 6206, the upper mold side positioning cylindrical surface 6220, and the outer abutting surface 6210 are coaxially located.

The upper mold side positioning cylindrical surface 6220 is formed as the radially inward inner circumferential surface of the lower portion of the upper cylindrical surface portion 6206 and the radially inward inner circumferential surface of the outer abutting surface 6210.

The outer abutting surface 6210 is disposed on the lower portion of the upper cylindrical surface portion 6206.

As illustrated in FIGS. 16 to 19, the lower mold 58 is coaxially disposed with the upper mold 56 under the upper mold 56.

The lower mold 58 includes the inner abutting surface 5802 and a lower mold side positioning cylindrical surface 5810.

The inner abutting surface 5802 is the section that abuts the section of the dome portion 22B near the cylinder portion 22C against the second annular surface (inner skirt surface) 3202 to attach the two via an adhesive.

The lower mold side positioning cylindrical surface 5810 is formed with a cylindrical surface with the axial center of the lower mold 58 as a center axis and is capable of engaging with the upper mold side positioning cylindrical surface 6220.

In the present embodiment, the lower mold 58 includes the plate portion 66 and a cylinder-like member 82.

The plate portion 66 is formed of a disk-like member that has an outer diameter that corresponds to the outer diameter of the second annular surface 3202, and as in the first embodiment, an aluminum alloy is used for the plate portion 66.

The upper surface of the outer circumferential portion of the plate portion 66 is formed as the inner abutting surface 5802.

The cylinder-like member 82 is disposed in a cylindrical shape standing upright from the plate portion 66 with an outer diameter less than the inner diameter of the cylinder portion 22C, is formed of a material with a lower thermal conductivity than that of the upper mold 56, with rigidity, and with a higher heat resistance than that of the innerliner 22 and is detachably attached to the upper surface of the plate portion 66. A fluororesin is used for the cylinder-like member 82, similar to the outer circumferential member 68 of the first embodiment.

The outer circumferential surface of the cylinder-like member 82 is formed as the lower mold side positioning cylindrical surface 5810, which is capable of engaging with the upper mold side positioning cylindrical surface 6220.

A curved surface 8202 is formed on the outer circumferential portion of the base end of the cylinder-like member 82. The curved surface 8202 gradually rises from the inner circumferential end of the inner abutting surface 5802 and is continuously connected to the lower mold side positioning cylindrical surface 5810.

A conical surface 8204 with a diameter that decreases upwards is formed on the outer circumferential end of the end of the cylinder-like member 82. The conical surface 8204 facilitates the smooth engagement of the upper mold side positioning cylindrical surface 6220 and the lower mold side positioning cylindrical surface 5810.

The lower mold 58 is composed of two sections 58A, 58B as in the first embodiment. As illustrated in FIGS. 21A and 21B, the sections 58A, 58B include the two plate sections 66A, 66B coupled together and swingable via the hinge 78 and, as illustrated in FIGS. 22A to 22D, two cylinder-like member sections 82A, 82B.

Half of each of the inner abutting surface 5802 and the lower mold side positioning cylindrical surface 5804 is formed on each of the plate sections 66A, 66B and the cylinder-like member sections 82A, 82B.

When the two plate sections 66A, 66B are in an open state, the inner abutting surface 5802 is formed from the outer circumferential portion of each of the plate sections 66A, 66B, and the lower mold side positioning cylindrical surface 5810 is formed from the outer circumferential surface of each of the cylinder-like member sections 82A, 82B.

As in the first embodiment, the shaft member 70 and the holding member 76 are provided on the plate section 66A.

Next, a process of attaching the innerliner 22 and the mouthpiece 26 together using the attaching device 80 of the second embodiment will be described.

As illustrated in FIG. 10, an adhesive is applied to the surface of the dome portion 22B near the cylinder portion 22C, and the mouthpiece 26 is placed on the surface of the dome portion 22B near the cylinder portion 22C so that the cylinder portion 22C is inserted on the inner side of the bulging portion 38.

Next, as in the first embodiment, the two plate sections 66A, 66B are put in a folded state and inserted inside the innerliner 22 from the inner side of the cylinder portion 22C via the shaft member 70, the worker inserts his/her hand from the inner side of the cylinder portion 22C to open the two plate sections 66A, 66B, and the worker rotates the holding member 76 via the shaft member 70 and engages the holding member 76 so that the two plate sections 66A, 66B are held in an open state.

Figure 16:
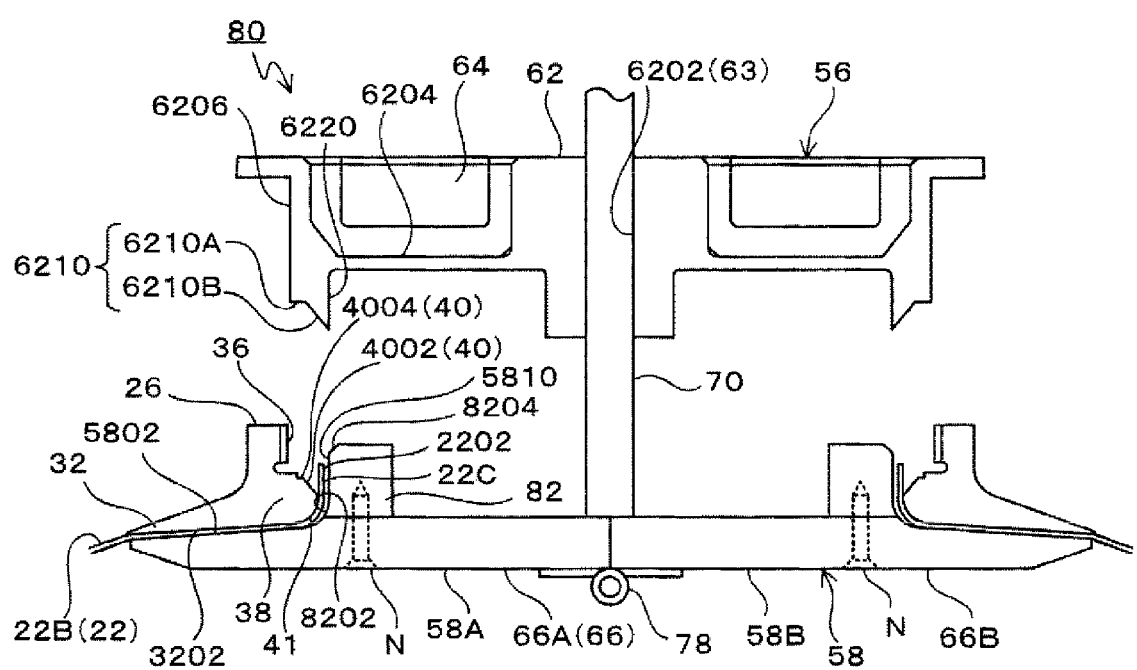
FIG. 16 is an explanatory diagram illustrating an open state of the lower mold inside the innerliner according to a second embodiment.

As illustrated in FIG. 16, the inner abutting surface 5802 of the lower mold 58 is abutted against the portion of the innerliner 22 abutted against the second annular surface 3202.

Figure 17:
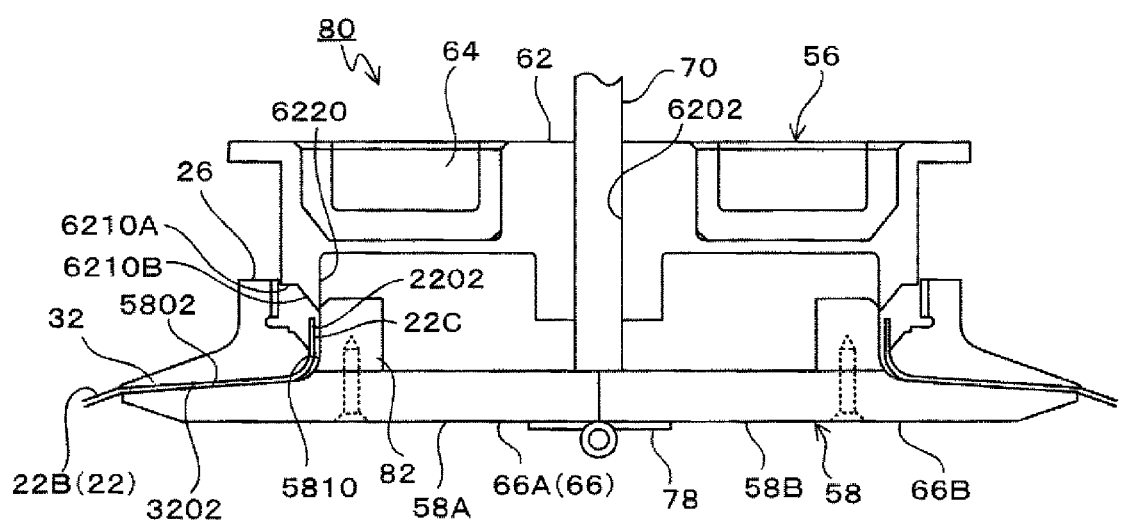
FIG. 17 is an explanatory diagram illustrating a state with the upper mold brought close to the lower mold according to the second embodiment.
Figure 18:
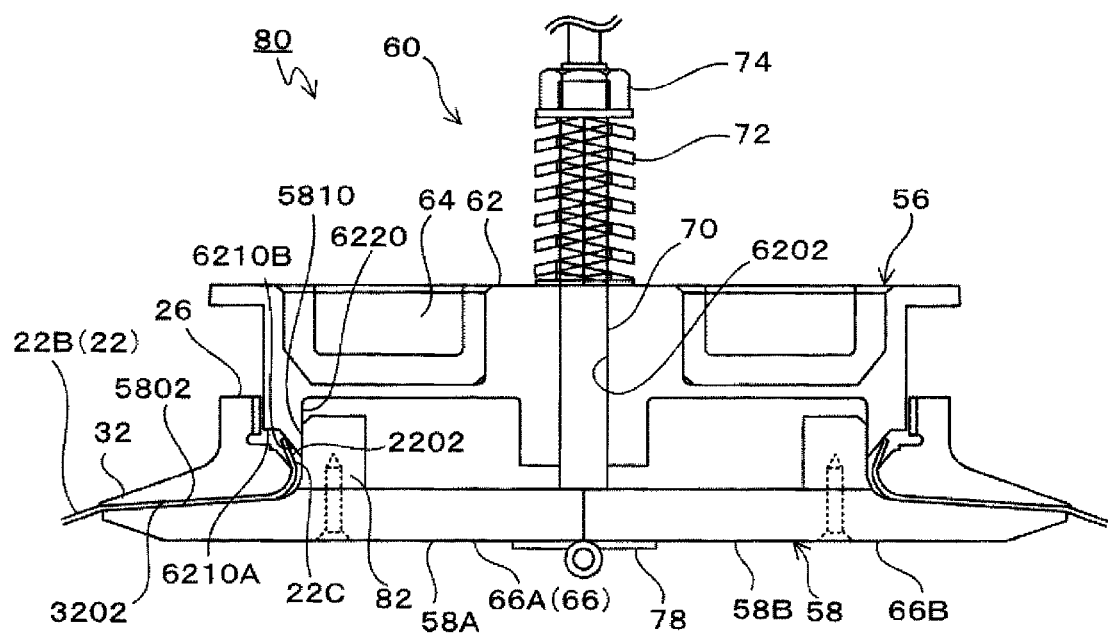
FIG. 18 is an explanatory diagram illustrating a state in which a coil spring is installed around a shaft member and a nut is engaged with the shaft member according to the second embodiment.

Next, as illustrated in FIGS. 16 to 18, the shaft member 70 is inserted in the shaft insertion hole 6202 of the upper mold 56, the coil spring 72 and the nut 74 are disposed above the upper mold 56, and the outer abutting surface 6210 of the upper mold 56 is heated via the heating portion 64. Then, the upper mold side positioning cylindrical surface 6220 is engaged with the lower mold side positioning cylindrical surface 5810.

Then, the nut 74 is rotated to adjust the elastic force of the coil spring 72 acting in the direction for the upper mold 56 to move toward the lower mold 58.

Figure 19:
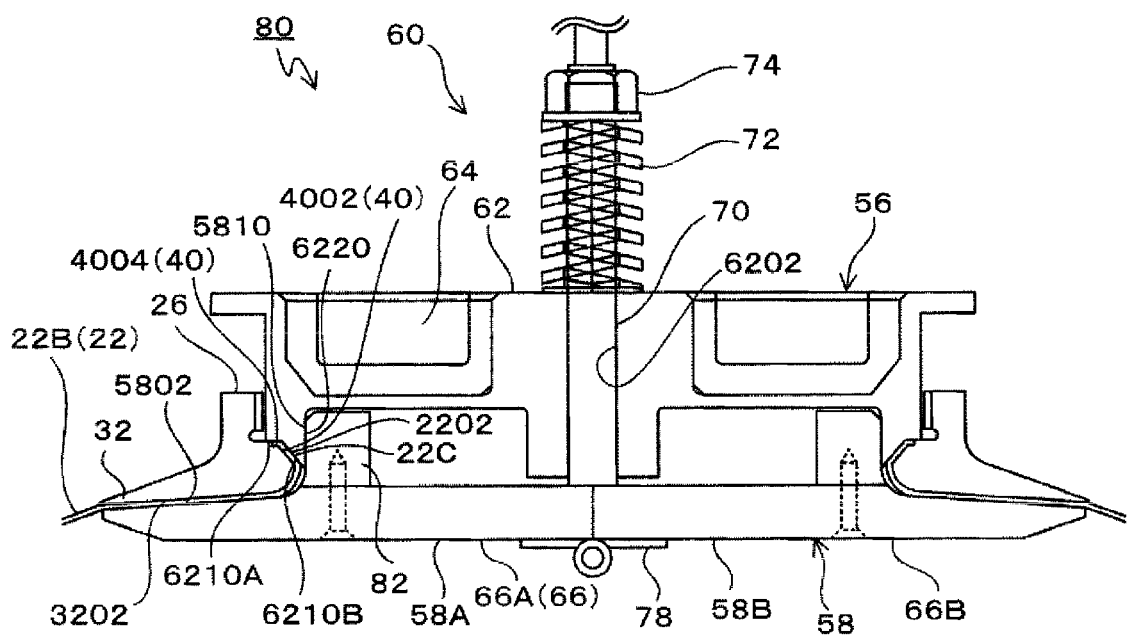
FIG. 19 is an explanatory diagram illustrating a state in which a section of the mouthpiece between the outer bulging surface and the inner skirt surface is sandwiched by the inner abutting surface of the lower mold and the outer abutting surface of the upper mold being biased by the elastic force of the coil spring according to the second embodiment.

As illustrated in FIG. 19, the elastic force of the coil spring 72 biases the upper mold 56 and the lower mold 58 in a direction toward one another, and the outer abutting surface 6210 of the upper mold 56 abuts the cylinder portion 22C of the innerliner 22 against the first annular surface 40 of the mouthpiece 26.

Specifically, the second abutting surface 6210B of the upper mold 56 thermally deforms the cylinder portion 22C outward in the radial direction so that the cylinder portion 22C abuts against the inclined surface 4002 of the mouthpiece 26.

Additionally, the first abutting surface 6210A of the upper mold 56 thermally deforms the end portion 2202 of the cylinder portion 22C outward in the radial direction so that the end portion 2202 of the cylinder portion 22C abuts against the annular surface 4004.

Furthermore, the elastic force of the coil spring 72 makes the inner abutting surface 5802 of the plate portion 66 abut the section of the dome portion 22B of the innerliner 22 located near the cylinder portion 22C against the second annular surface 3202 of the mouthpiece 26.

With the elastic force of the coil spring 72 in effect, the abutment of the outer abutting surface 6210 of the upper mold 56 against the first annular surface 40 of the cylinder portion 22C; and the abutment of the inner abutting surface 5802 of the lower mold 58 against the second annular surface 3202 of a section of the dome portion 22B near the cylinder portion 22C are maintained for the required amount of time.

In such processing, by the shaft member 70 being inserted into the shaft insertion hole 6202 of the upper mold 56, and by the upper mold side positioning cylindrical surface 6220 of the upper mold 56 being inserted into the lower mold side positioning cylindrical surface 5810 of the lower mold 58, the upper mold 56 and the lower mold 58 are coaxially positioned.

After the required amount of time has elapsed, the nut 74 is operated, and the nut 74 and the coil spring 72 are removed from the shaft member 70. Then the upper mold 56 is removed.

Next, the lower mold 58 is moved downward from the mouthpiece 26 via the shaft member 70, and the holding member 76 is rotated via the shaft member 70 to put the plate sections 66A, 66B in a foldable state.

Next, the worker inserts his/her hand from the inner side of the cylinder portion 22C, folds up the two plate sections 66A, 66B, and then removes the lower mold 58 to the outside of the innerliner 22 from the inner side of the mouthpiece 26 via the shaft member 70. This completes the process.

According to the second embodiment, as with the first embodiment, the cylinder portion 22C of innerliner 22 can be reliably thermally deformed to conform to the first annular surface 40 of the mouthpiece 26, and the inner circumferential portion of the dome portion 22B can be reliably attached to the skirt portion 32 by an adhesive.

Note that in the present embodiment, a case has been described in which the mouthpiece side joining portion is formed as the female thread 36 and the lid side joining portion is formed as the male thread 50. However, in another embodiment of the present technology, the mouthpiece side joining portion may be formed as the male thread and the lid side joining portion may be formed as the female thread, with the lid 34 covering the cylinder-like portion 30.

The invention claimed is:

1. A device for attaching a mouthpiece to an innerliner of an aircraft water tank, wherein a cylinder portion centrally located on a dome portion of an innerliner is located on an inner side of an annular mouthpiece, the cylinder portion abuts against a first annular surface that extends in an annular manner with an axial center of the mouthpiece as a center, and a section of the dome portion near the cylinder portion abuts against a second annular surface that extends in an annular manner with the axial center of the mouthpiece as a center and that faces an opposite direction to the first annular surface, the device comprising:
   an upper mold;
   a lower mold; and
   a biasing portion that biases the upper mold and the lower mold toward one another;
   the lower mold comprising
   two sections coupled together and swingable between an open state in which the two sections are opened flat and a folded state in which the two sections are folded and comprising an inner abutting surface capable of abutting a section of the dome portion near the cylinder portion of the innerliner against the second annular surface, a holding portion capable of holding the two sections in the open state, and a shaft member joined to one of the two sections that projects along an axial center of the inner abutting surface from a center of the two sections in the open state; and the upper mold comprising an outer abutting surface coaxially disposed with the lower mold, from above the lower mold, in a manner allowing the outer abutting surface to move, the outer abutting surface abutting the cylinder portion against the first annular surface, the shaft member being inserted into the outer abutting surface.

2. The device for attaching a mouthpiece to an innerliner of an aircraft water tank according to claim 1, wherein the biasing portion comprises a coil spring installed around a section of the shaft member located on an opposite side of the upper mold to the lower mold.

3. The device for attaching a mouthpiece to an innerliner of an aircraft water tank according to claim 2, wherein the biasing portion comprises a nut engaged with a section of the shaft member located on the opposite side of the upper mold to the lower mold;

the coil spring is disposed between the upper mold and the nut; and a biasing force of the coil spring can be adjusted by rotating the nut.

4. The device for attaching a mouthpiece to an innerliner of an aircraft water tank according to claim 1, wherein the holding portion comprises a holding member supported by the shaft member and disposed on a surface on an opposite side to a side where the shaft member of the one of the sections projects; and the holding member is disposed in a manner allowing it to move between a first position located on the surface of the one of the sections, the first position allowing the two sections to fold, and a second position that extends across a lower surface of the two sections, the second position allowing the two sections to be held in the open state.

5. The device for attaching a mouthpiece to an innerliner of an aircraft water tank according to claim 4, wherein the shaft member is supported by the one of the sections in a rotatable manner;

the holding member is attached to the shaft member in an integrally rotatable manner; and the holding member at a first rotational position of the shaft member corresponds to the first position, and the holding member at a second rotational position of the shaft member 180 degrees rotated from the first rotational position corresponds to the second position.

6. The device for attaching a mouthpiece to an innerliner of an aircraft water tank according to claim 1, wherein the upper mold comprises an upper mold body comprising the outer abutting surface and a heating portion provided on the upper mold body that heats the outer abutting surface.

7. The device for attaching a mouthpiece to an innerliner of an aircraft water tank according to claim 2, wherein the holding portion comprises a holding member supported by the shaft member and disposed on a surface on an opposite side to a side where the shaft member of the one of the sections projects; and the holding member is disposed in a manner allowing it to move between a first position located on the surface of the one of the sections, the first position allowing the two sections to fold, and a second position that extends across a lower surface of the two sections, the second position allowing the two sections to be held in the open state.

8. The device for attaching a mouthpiece to an innerliner of an aircraft water tank according to claim 7, wherein the shaft member is supported by the one of the sections in a rotatable manner;

the holding member is attached to the shaft member in an integrally rotatable manner; and the holding member at a first rotational position of the shaft member corresponds to the first position, and the holding member at a second rotational position of the shaft member 180 degrees rotated from the first rotational position corresponds to the second position.

9. The device for attaching a mouthpiece to an innerliner of an aircraft water tank according to claim 8, wherein the upper mold comprises an upper mold body comprising the outer abutting surface and a heating portion provided on the upper mold body that heats the outer abutting surface.

\* \* \* \* \*